Feb. 10, 1931. J. R. ROGERS 1,791,687
TYPOGRAPHICAL COMPOSING AND DISTRIBUTING MACHINE
Filed July 1, 1929 22 Sheets-Sheet 5

INVENTOR
John R. Rogers
BY
Morrison Kennedy & Campbell
ATTORNEYS

Feb. 10, 1931.  J. R. ROGERS  1,791,687
TYPOGRAPHICAL COMPOSING AND DISTRIBUTING MACHINE
Filed July 1, 1929  22 Sheets-Sheet 7

INVENTOR
John R. Rogers
BY
ATTORNEYS

Feb. 10, 1931. J. R. ROGERS 1,791,687
TYPOGRAPHICAL COMPOSING AND DISTRIBUTING MACHINE
Filed July 1, 1929 22 Sheets-Sheet 9
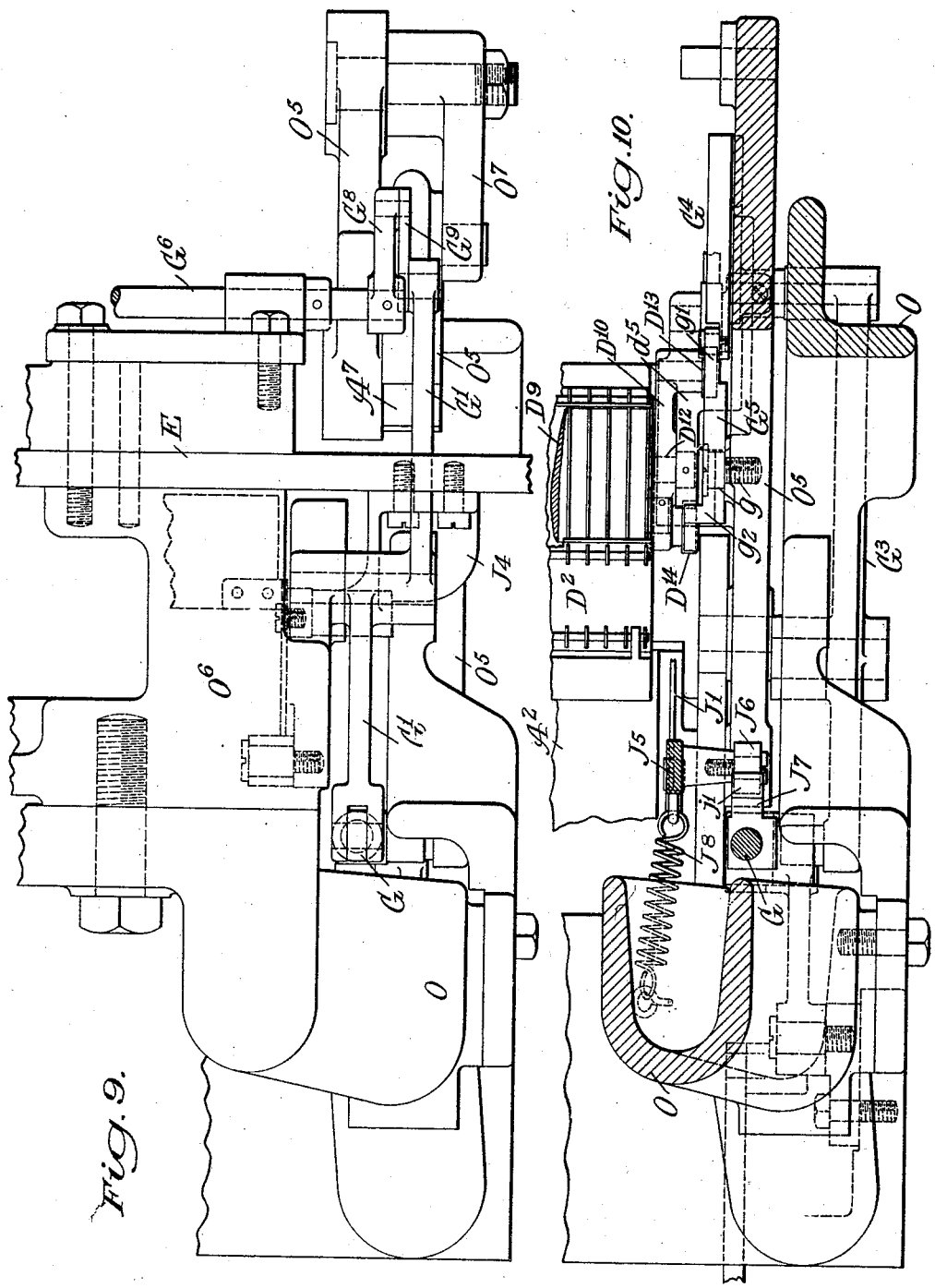
INVENTOR
John P. Rogers
BY
Morrison Kennedy & Campbell
ATTORNEYS

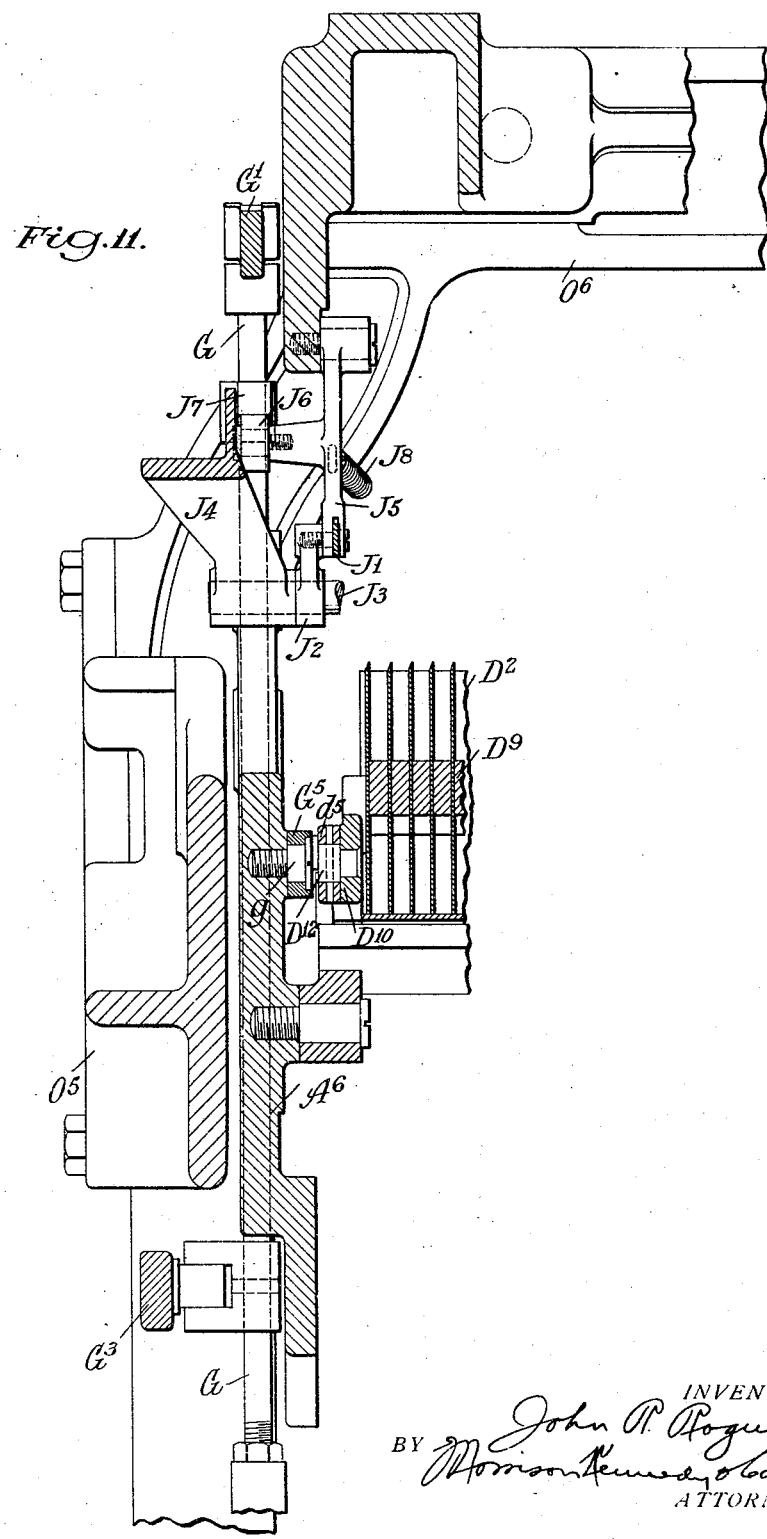

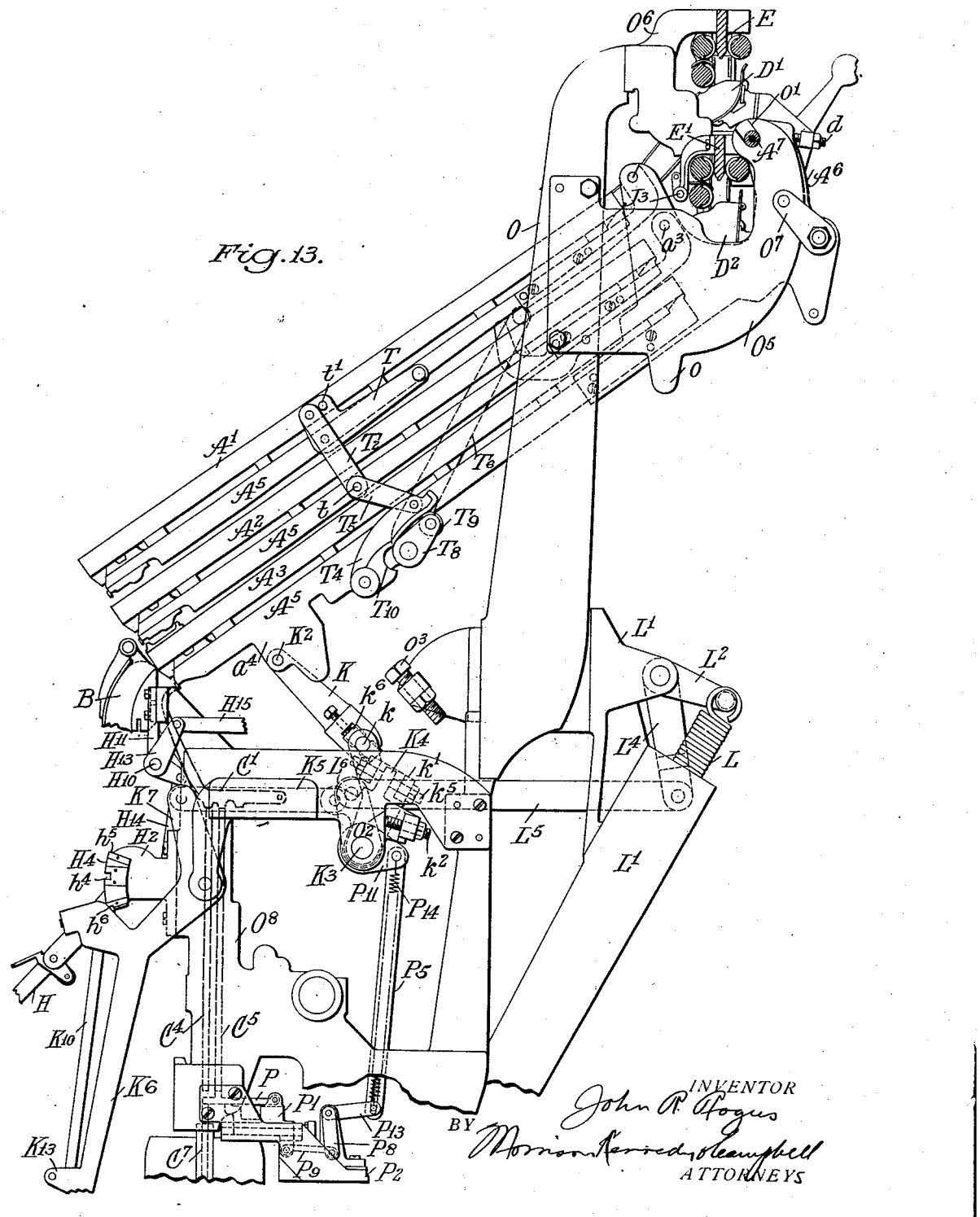

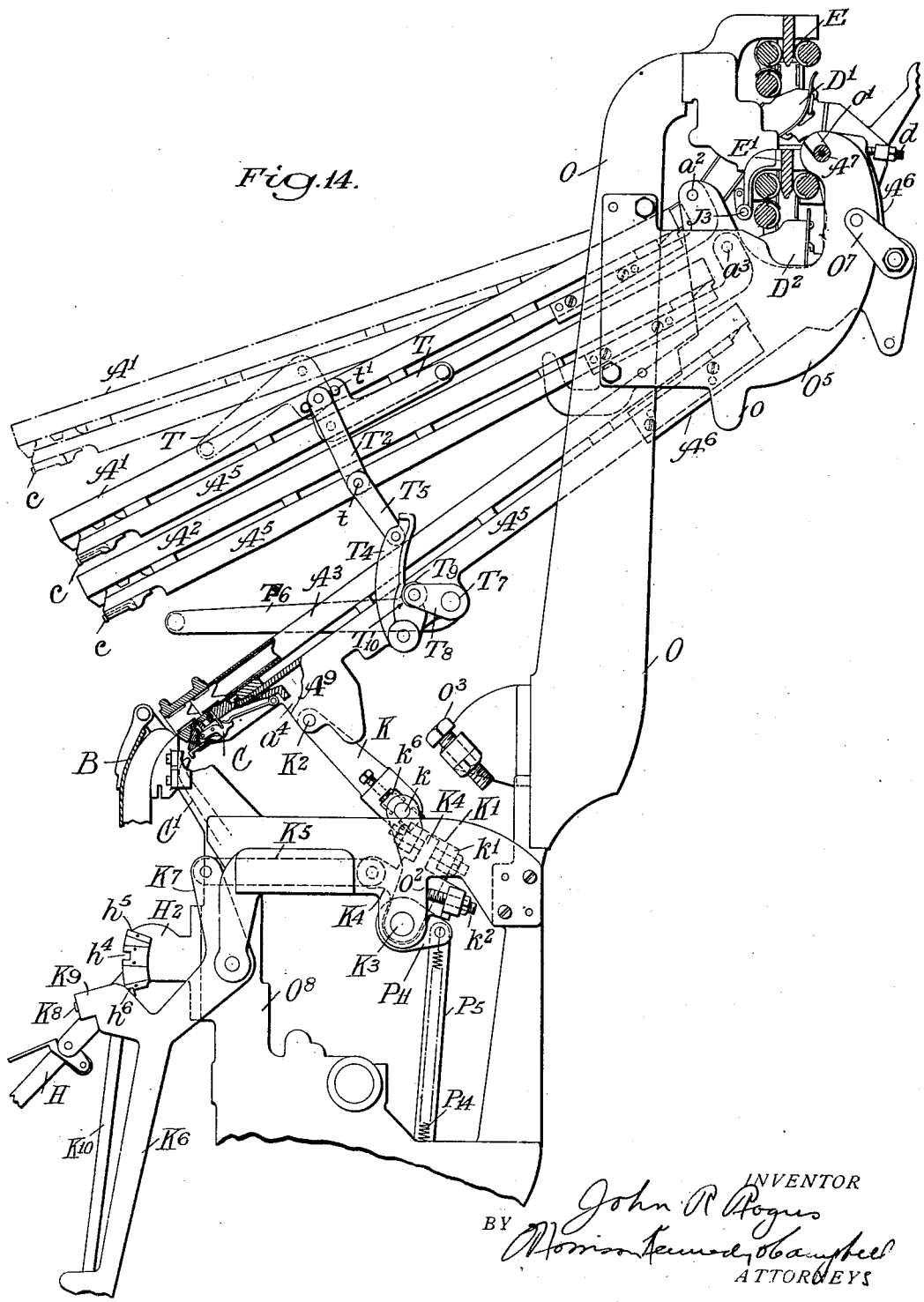

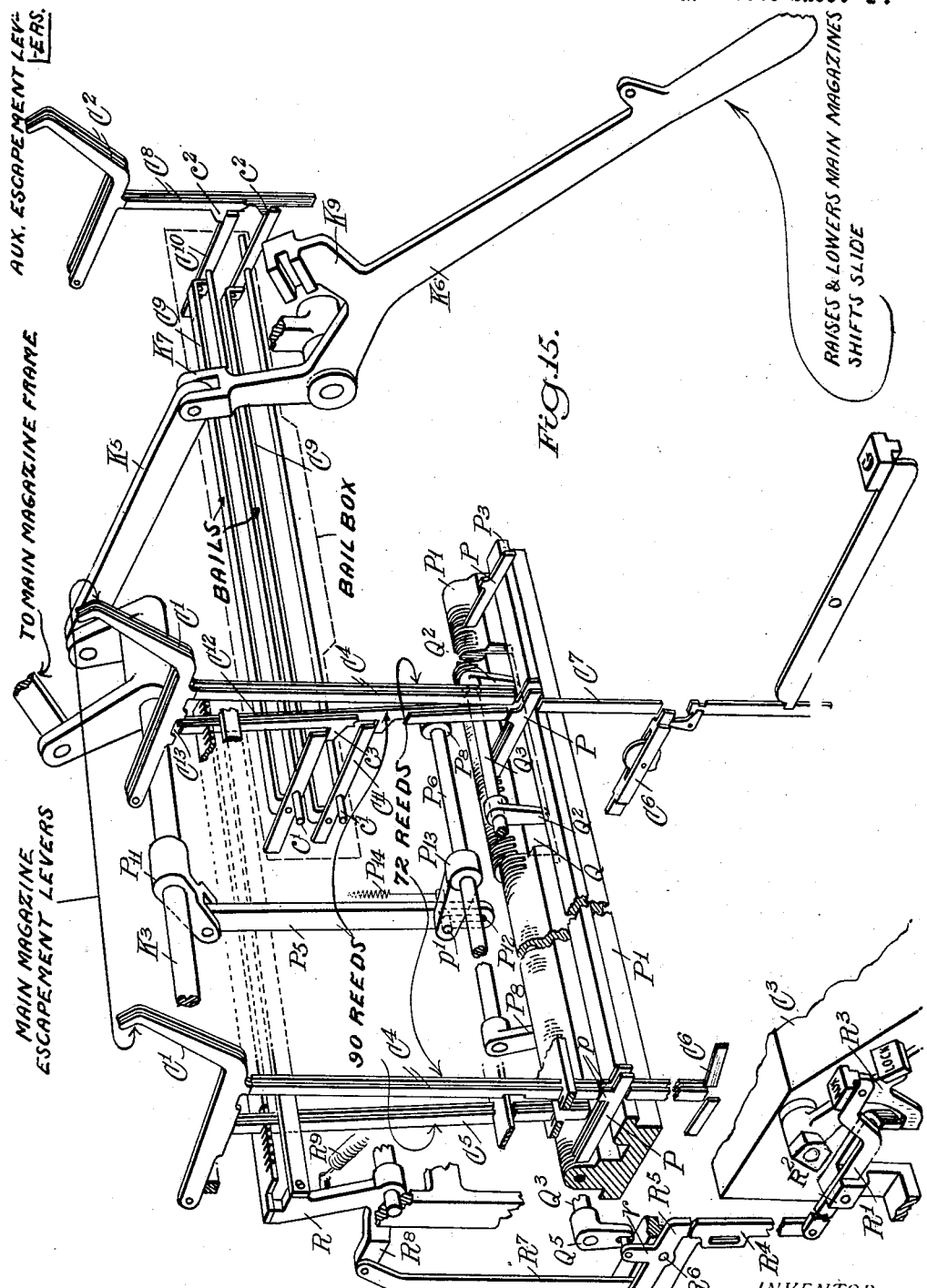

Feb. 10, 1931.　　　　J. R. ROGERS　　　　1,791,687
TYPOGRAPHICAL COMPOSING AND DISTRIBUTING MACHINE
Filed July 1, 1929　　22 Sheets-Sheet 15
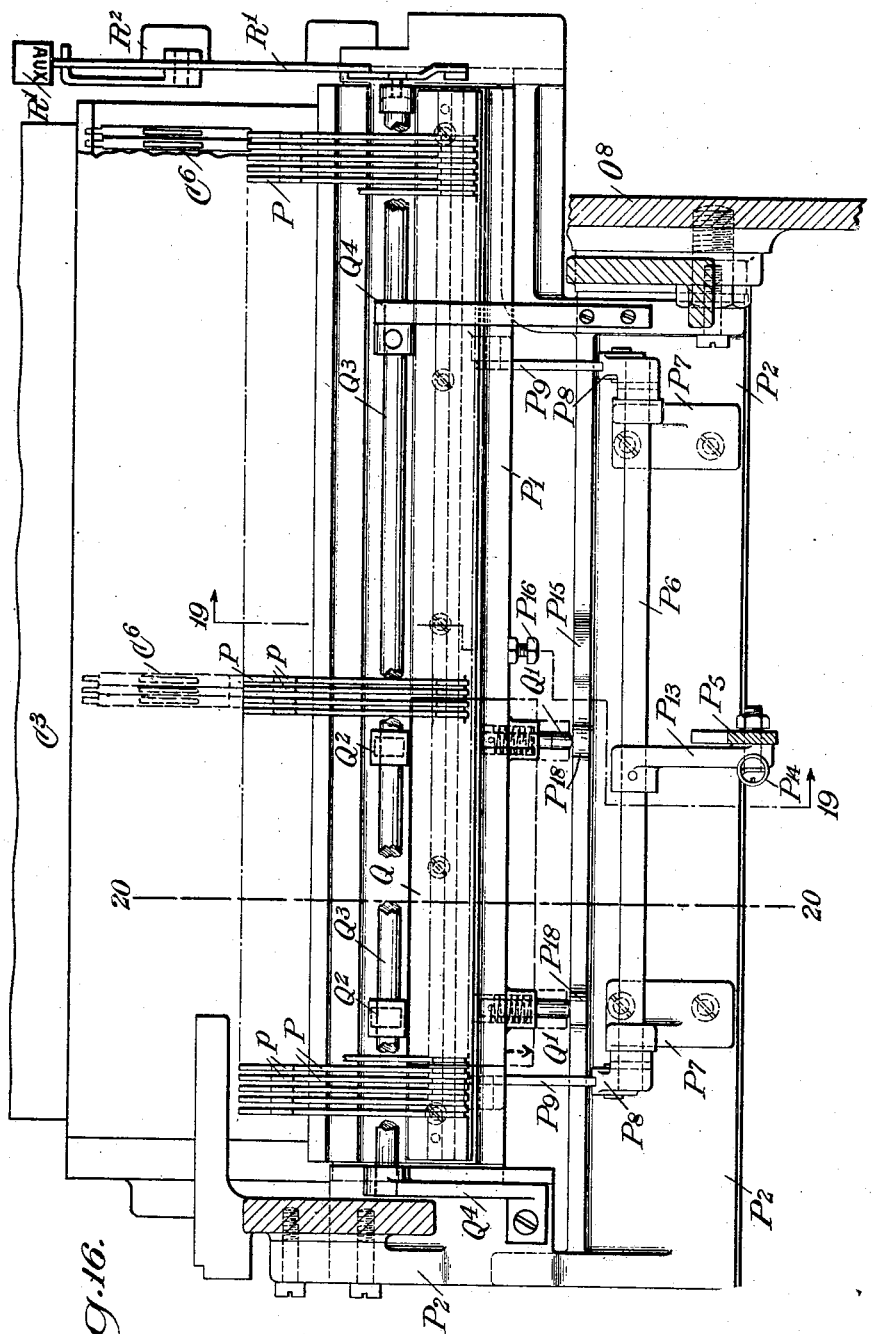

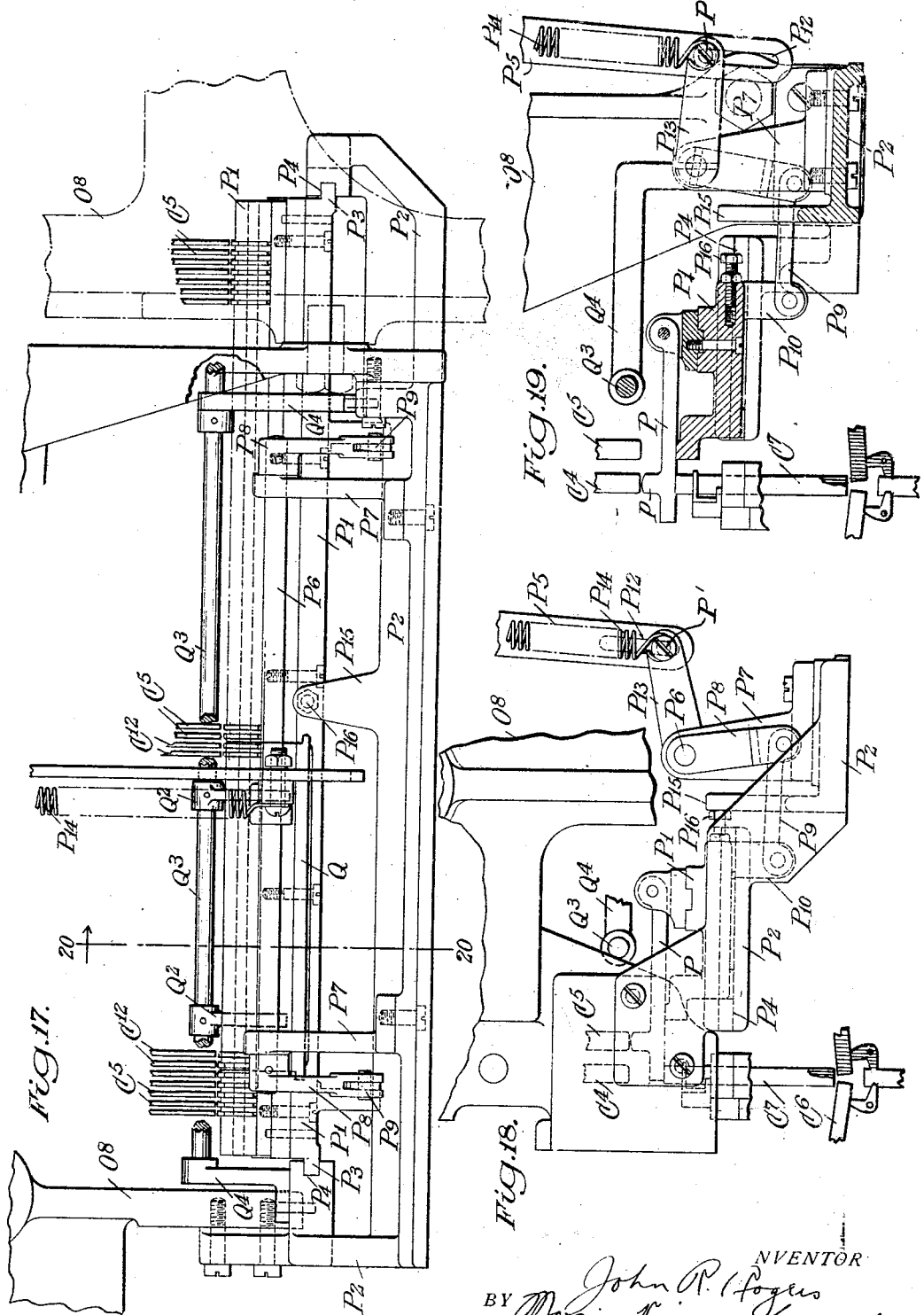

Feb. 10, 1931. J. R. ROGERS 1,791,687
TYPOGRAPHICAL COMPOSING AND DISTRIBUTING MACHINE
Filed July 1, 1929 22 Sheets-Sheet 17

INVENTOR.
John R. Rogers
BY
Morrison Kennedy Campbell
ATTORNEYS

Feb. 10, 1931.  J. R. ROGERS  1,791,687
TYPOGRAPHICAL COMPOSING AND DISTRIBUTING MACHINE
Filed July 1, 1929   22 Sheets-Sheet 18
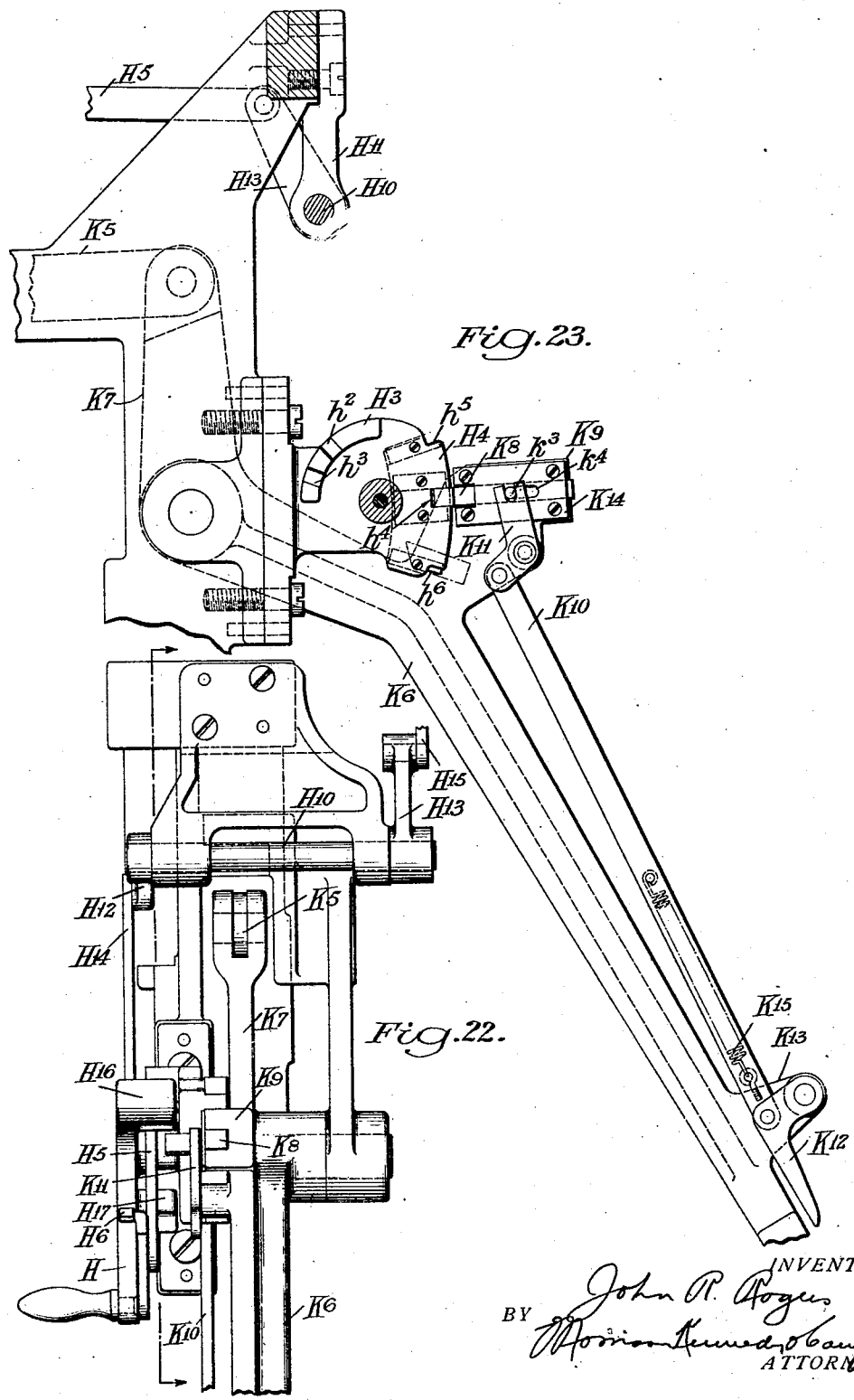

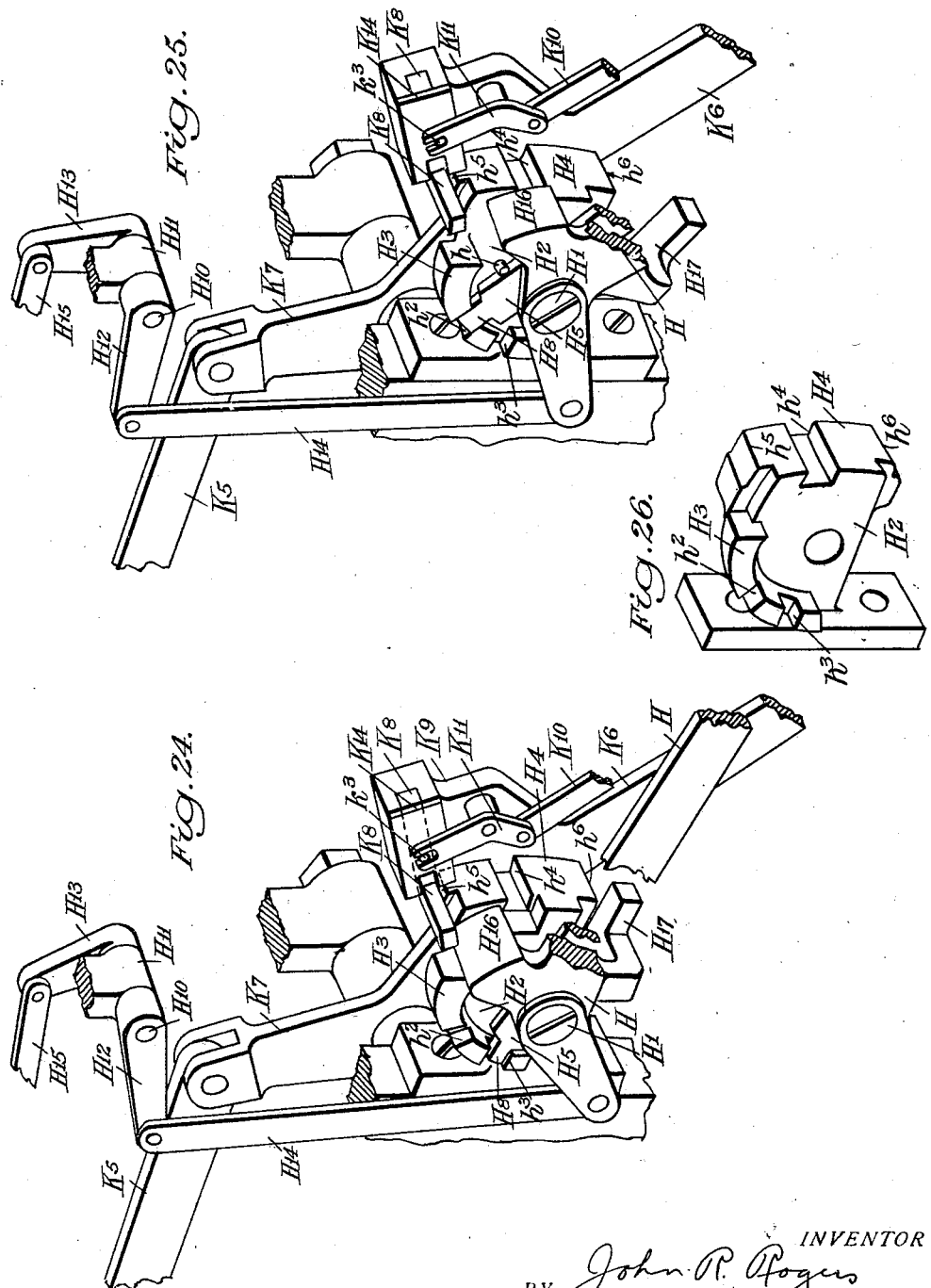

Feb. 10, 1931.  J. R. ROGERS  1,791,687

TYPOGRAPHICAL COMPOSING AND DISTRIBUTING MACHINE

Filed July 1, 1929  22 Sheets-Sheet 20

INVENTOR
John R. Rogers
BY
ATTORNEYS

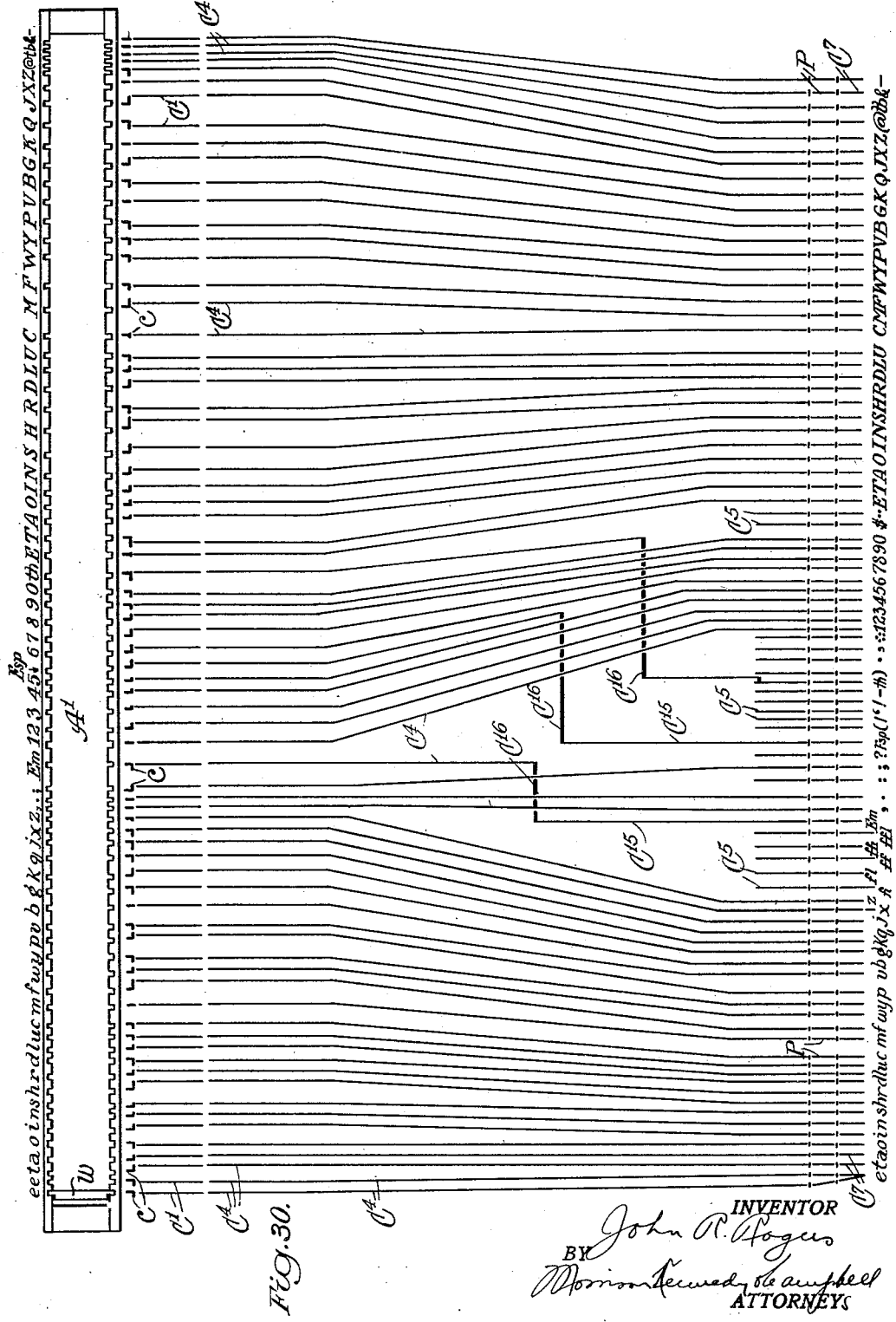

Patented Feb. 10, 1931

1,791,687

UNITED STATES PATENT OFFICE

JOHN R. ROGERS, OF BROOKLYN, NEW YORK, ASSIGNOR TO MERGENTHALER LINOTYPE COMPANY, A CORPORATION OF NEW YORK

TYPOGRAPHICAL COMPOSING AND DISTRIBUTING MACHINE

Application filed July 1, 1929. Serial No. 374,995.

This invention relates to typographical composing and distributing machines, such as linotype machines of the general organization represented by Letters Patent of the United States to O. Mergenthaler, No. 436,532, wherein circulating matrices are released from a magazine in the order in which their characters are to appear in print and then assembled in line, the composed line transferred to the face of a slotted mold, the mold filled with molten metal to form a slug or linotype against the matrices which produce the type characters thereon, and the matrices thereafter returned through distributing mechanism to the magazine from which they started.

There are now in use two distinct machines, one designed for the use of ordinary matrix fonts comprising ninety different characters suitable for the more usual composition or "straight" matter, and the other designed for special matrix fonts comprising only seventy-two characters suitable for head letter and display work, etc. It is the general object of the present invention to provide a single machine capable of handling any of the ordinary matrix fonts or any of the special matrix fonts, or both together, so that such machine may be used for any class of work desired. The various improvements by which this result is accomplished will best be understood from the detailed description to follow.

Referring to the drawings:

Fig. 9 is a top plan view of the parts shown in Fig. 6;

Fig. 10 is a horizontal section taken on the line 10—10 of Fig. 6;

Fig. 11 is a vertical section taken on the line 11—11 of Fig. 6;

Fig. 13 is a side elevation of the machine, showing the magazines raised preparatory to separation;

Fig. 14 is a view similar to Fig. 13, showing the manner of separating the magazines preparatory to their removal;

Fig. 15 is a skeleton perspective view of the various connections between the keyboard and the escapement actuating devices for the main and auxiliary magazines;

Fig. 16 is a plan view, partly in section, of the improved mechanism for controlling the operation of the escapements;

Fig. 17 is a rear view of this mechanism;

Fig. 18 is an end view looking from the left of Fig. 17;

Fig. 19 is a vertical section taken on the line 19—19 of Fig. 16;

Fig. 22 is a front elevation of the hand control devices;

Fig. 23 is a vertical section taken on the line 23—23 of Fig. 22;

Fig. 24 is a perspective view of the hand control devices, showing them set for the first and second magazines;

Fig. 25 is a perspective view similar to Fig. 24, showing the said devices set for the first and third magazines;

Fig. 26 is a detail perspective view of the segmental locking block;

Fig. 30 is a skeleton perspective view, showing diagrammatically the various connections throughout the improved machine.

Figure 1:
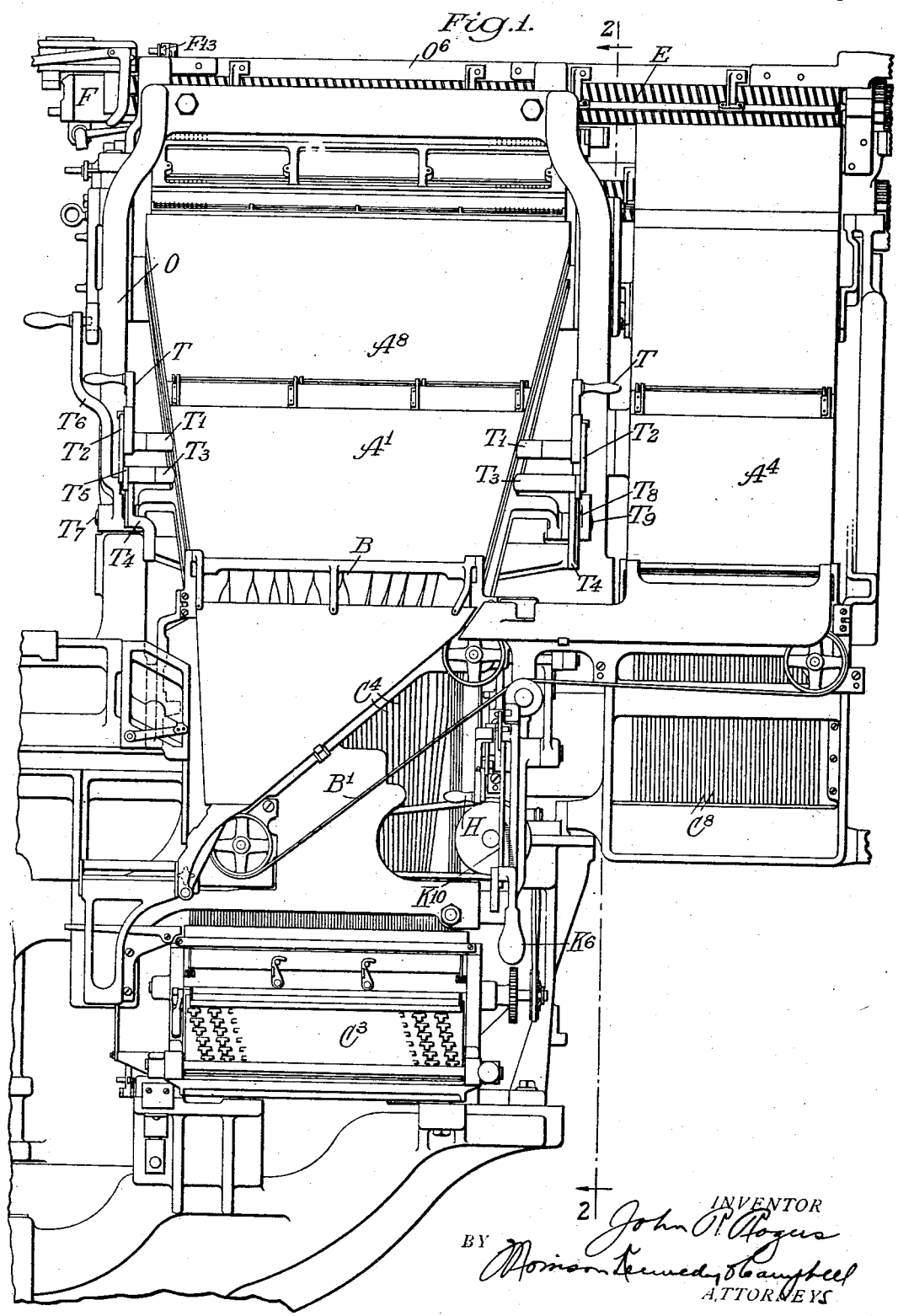
Fig. 1 is a front elevation of a linotype machine, equipped with the present improvements.
Figure 2:
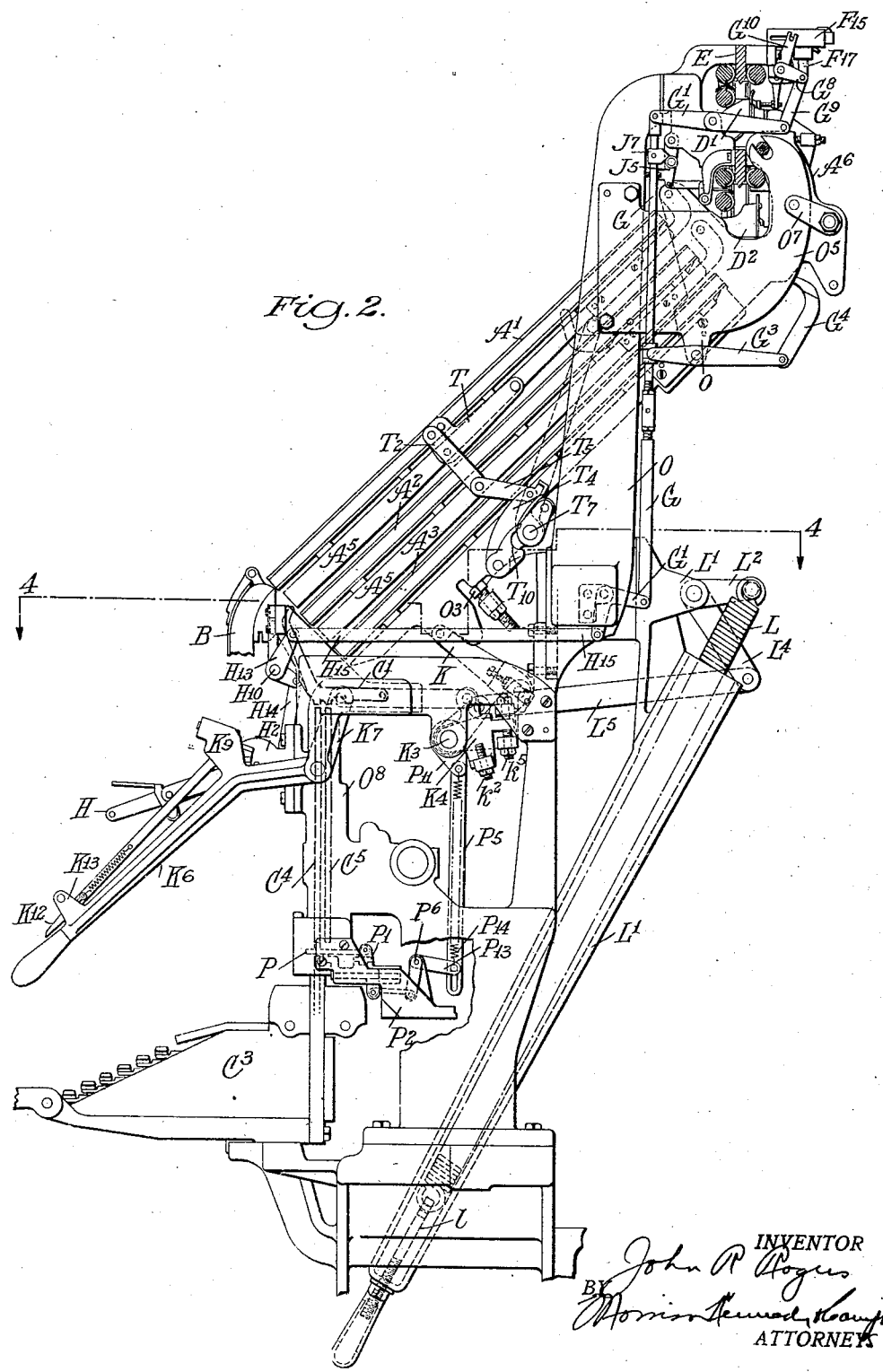
Fig. 2 is a side elevation partly in section, taken on the line 2—2 of Fig. 1.

As best shown in Figs. 1 and 2, the machine is equipped with three superposed main magazines $A^1$, $A^2$, $A^3$, and two auxiliary magazines $A^4$ arranged side by side or in tandem. The two lower main magazines $A^2$, $A^3$ are of standard form, each being provided with ninety-one grooves or channels spaced apart in the usual way to adapt them to contain the regular ninety character fonts W, whereas the top or first magazine $A^1$, although of the same width as the magazines $A^2$, $A^3$, is provided with only seventy-three channels spaced apart in a different manner to adapt it to contain the seventy-two character display fonts X. The magazines are mounted on separate base frames $A^5$, those of each series being pivotally mounted in the fixed machine frame so that they may be swung upwardly and downwardly to locate one or another in operative relation to a common fixed assembler throat or raceway B. The main magazines, as well as the auxiliary magazines, are each provided with escapements C (shown only in connection with the main magazines), which control the release of the matrices therefrom and which are adapted to be actuated, when the selected magazines are in operative position, by two series of pivoted levers $C^1$, $C^2$, the levers $C^1$ being arranged to cooperate with the escapements of the main magazines and the levers $C^2$ being arranged for cooperation with the escapements of the auxiliary magazines. The levers of both series are aligned horizontally and are operated from a single keyboard $C^3$ through intermediate connections later to be described. After assemblage and casting, the matrices are carried upward and delivered to the distributing mechanism, which first assorts them according to font and then releases them according to character so that they may be returned through one or another of the channeled magazine entrances $D^1$, $D^2$, $D^3$, $D^4$ to the magazine from which they started. The entrances $D^1$, $D^2$ connect the main magazines $A^1$, $A^2$, $A^3$ with the distributing mechanism, while the entrances $D^3$, $D^4$ (Fig. 3) connect the auxiliary magazines $A^4$ therewith.

The distributing mechanism (see Figs. 3, 5, 6 and 12) includes the two character distributors E, $E^1$ arranged one directly above the other and a font separator located at the entrance to the upper distributor E. Each of the character distributors comprises, as usual, a longitudinally ribbed or toothed bar for releasing the matrices at different points according to character and a distinct set of constantly driven conveying screws for propelling the matrices along the bar. In the present instance, that portion of the upper distributor bar above the main magazines is provided with seventy-three tooth combinations unequally spaced apart to cooperate with the upper seventy-three channeled magazine $A^1$, and the corresponding portion of the lower distributor bar is provided with ninety-one tooth combinations equally spaced apart to cooperate with the two regular ninety-one channeled magazines $A^2$, $A^3$. The channels of the respective magazine entrances $D^1$, $D^2$ are spaced apart in like manner at their upper ends so that matrices released by the bars will be guided directly into their appropriate magazine channels. The auxiliary magazines $A^4$ however are much narrower than the main magazines, being provided respectively with only thirty-two matrix channels which are aligned with the channels of the magazine entrances $D^3$, $D^4$ and with corresponding tooth combinations formed on the extended right-hand portions of the upper and lower distributor bars.

The font separator (see Fig. 12) is somewhat similar to the one shown and described in the Kennedy Patent No. 1,705,977, comprising a box F equipped with a reciprocating finger $F^1$ for lifting the matrices successively into the threads of the distributor screws, and a selecting bridge $F^2$ adapted by means of a rib $f$ to support matrices belonging to one font until they become engaged with the upper distributor bar and to permit those of other fonts to seek a slightly lower level and thus escape the bar. Matrices to be handled by the upper distributor may, therefore, be plain or solid at their bottom edges so as to receive support from the bridge $F^2$ (or, if notched, have their notches located out of register with the transverse rib $f$), while those intended for the lower distributor $E^1$ should have a notch located to register with the rib $f$ (see Fig. 5). The notched matrices fall astride the rib $f$ and are advanced by the upper distributor screws across short rail sections $F^3$, which drop them into a chute $F^4$ leading to a lower box $F^5$ arranged at the entrance to the lower distributor $E^1$. From this box the matrices are fed, one after another, into the threads of the lower distributor screws, which carry them along the associated bar for final distribution.

Figure 8:
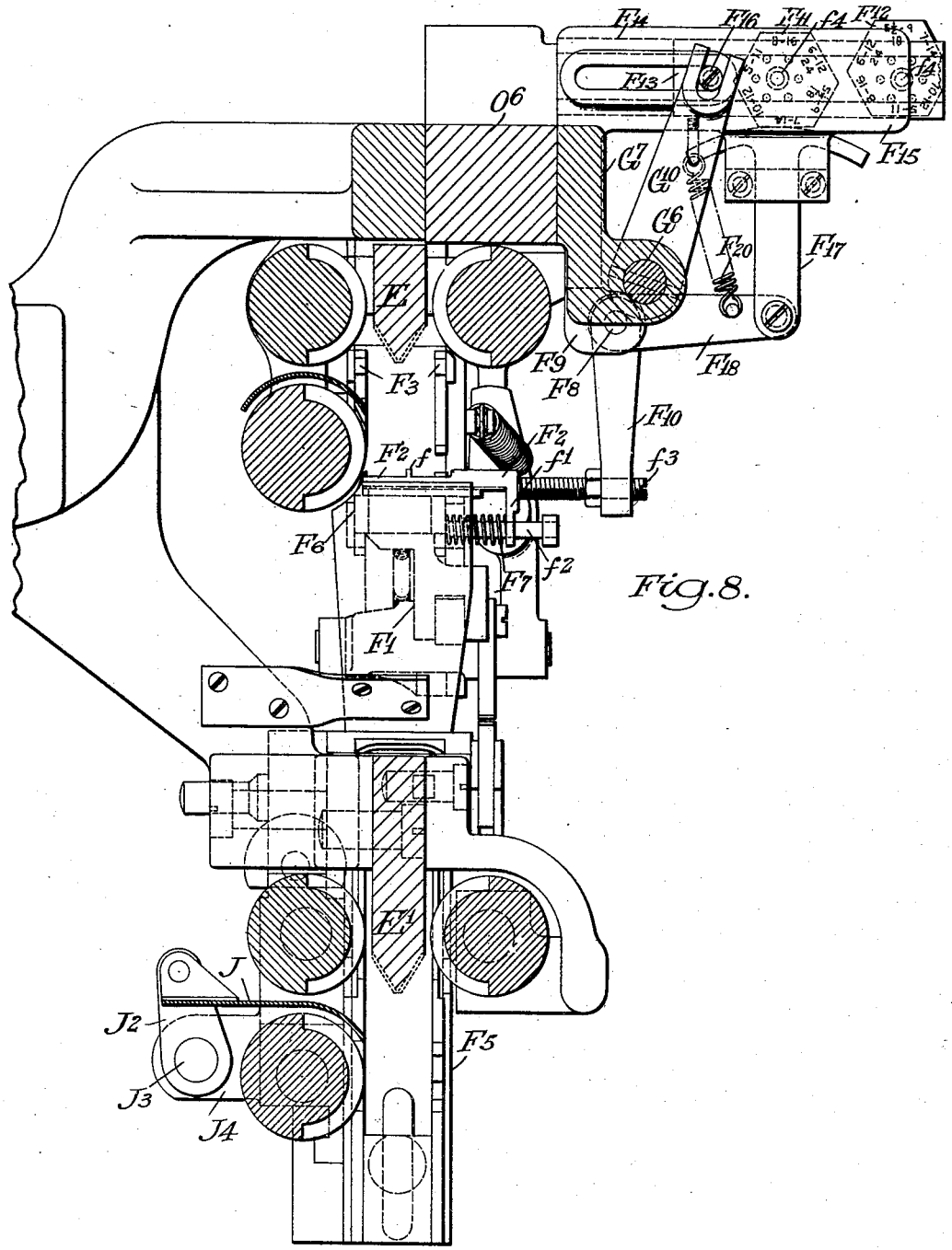
Fig. 8 is a vertical section on an enlarged scale through the distributing mechanism, taken at a different point.
Figure 12:
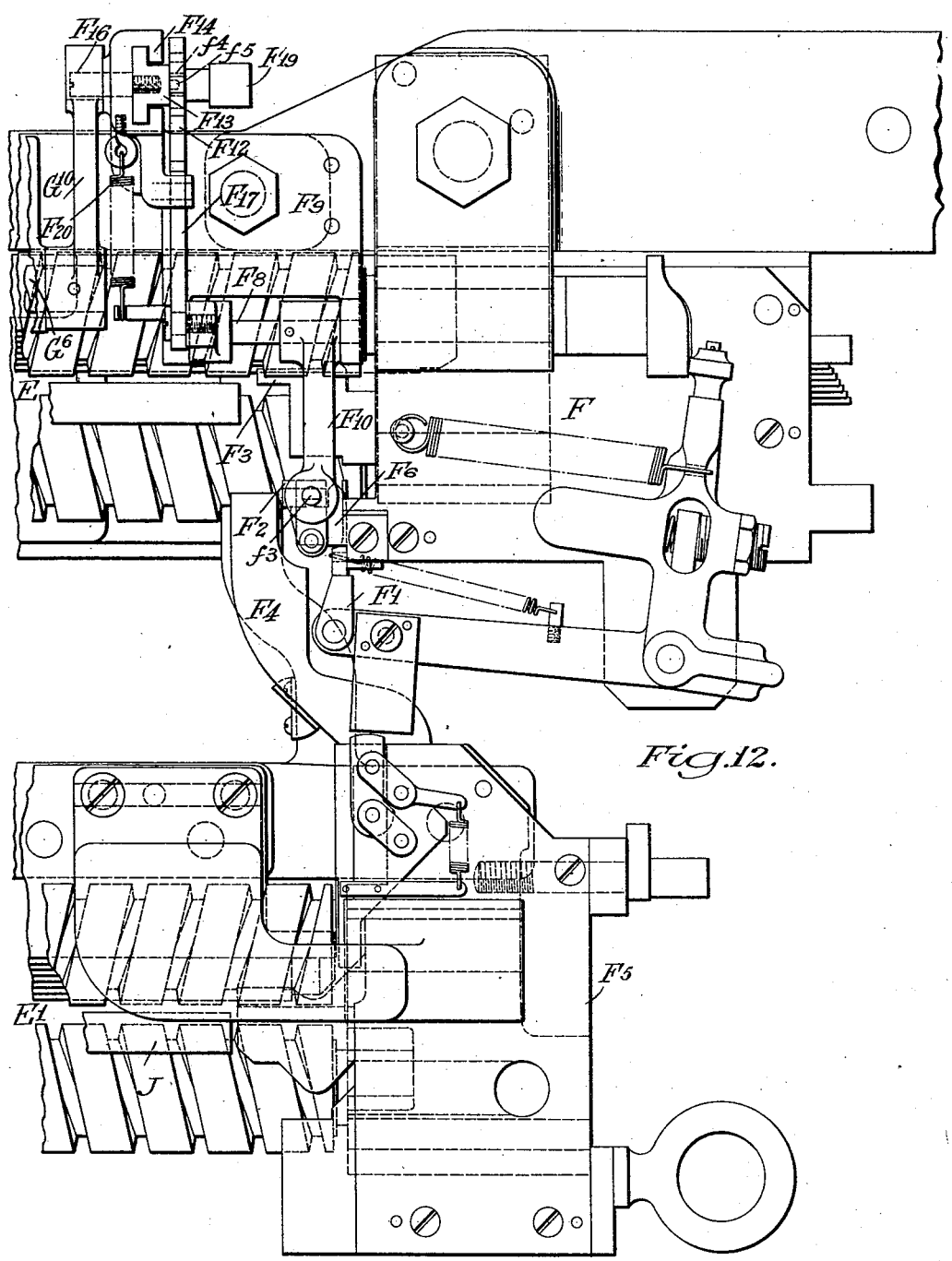
Fig. 12 is a rear elevation of the receiving end of the distributing mechanism, showing the font separator and parts associated therewith.
Figure 20:
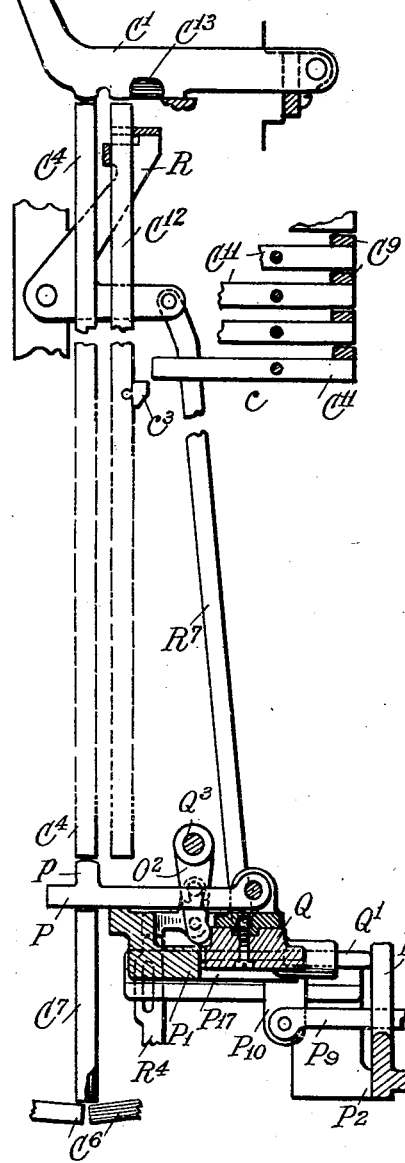
Fig. 20 is a section taken on the line 20—20 of Figs. 16 and 17, showing the manner of connecting the keyboard to the escapement actuating members of a main magazine exclusively.
Figure 21:
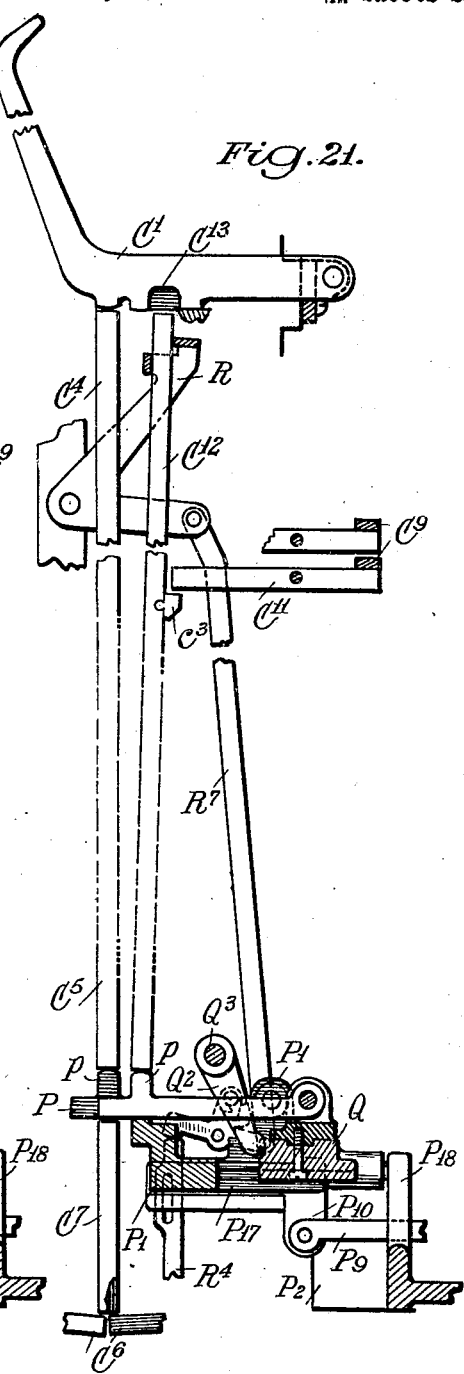
Fig. 21 is a view similar to Fig. 20, showing the keyboard connected to both a main and an auxiliary magazine.

Since the various regular matrix fonts are formed with differently located notches in the bottom edges of the matrices, the selecting bridge $F^2$, to function properly in controlling the delivery of matrices to the respective distributors, is adjustably mounted so that the rib $f$ may be brought into position to register with the notches of any particular matrix font selected. In the embodiment illustrated and as best shown in Fig. 8, the bridge $F^2$ is slidably supported for transverse movement on a fixed block $F^6$, and formed with a depending lug $f^1$, which serves as an abutment for a compression spring $F^7$, the latter being interposed between the lug $f^1$ and the block $F^6$ and tending to press the bridge constantly toward the rear. The movement of the bridge in this direction, however, is limited by the head portion of a pin $f^2$, which passes through an aperture in the lug $f^1$ and is threaded into the block $F^6$. The means employed for moving the bridge in the opposite direction includes a rock shaft $F^8$ journaled above the bridge in a fixed bracket $F^9$ and provided with a depending arm $F^{10}$, which latter carries at its free end an adjusting screw $f^3$ arranged to engage the lug $f^1$ and adapted to sustain the bridge against the tension of the spring $F^7$.

The rocking of the shaft $F^8$ and the consequent adjustment of the bridge is effected by a pair of hexagonal gauge plates $F^{11}$, $F^{12}$ arranged side by side and carried on a horizontal slide $F^{13}$, which is mounted in suitable guideways $F^{14}$ in a lateral extension $F^{15}$ of the bracket $F^9$. The slide $F^{13}$ is movable to and fro (by automatic mechanism later to be described) to bring one or the other of said gauge plates into engagement with the curved upper edge of an upright T-shaped actuating shoe $F^{17}$, guided at its upper end in the bracket $F^9$ and pivotally connected at its lower end to an arm $F^{18}$ projecting rearwardly from the rock shaft $F^8$. The gauge plates $F^{11}$, $F^{12}$ are eccentrically mounted on pivot pins $f^4$ and are capable of rotary adjustment, each being provided with a pull pin $F^{19}$ (Fig. 12), by which they may be withdrawn axially out of engagement with a locking stud $f^5$ protruding from the slide $F^{13}$, then turned to bring a selected side edge into action, and finally relocked in their newly adjusted positions. In this connection, it may be observed (see Fig. 8) that the plates $F^{11}$, $F^{12}$ are provided with corresponding groups of numerals associated with their respective side faces, which indicate the point size of various regular matrix fonts and which thus enable the operator to effect an adjustment properly and with the desired facility. A pull string $F^{20}$ connected to the arm $F^{18}$ and anchored to the bracket $F^9$ tends constantly to raise the shoe $F^{17}$ and holds the upper grooved edge thereof resiliently engaged with the selected side edge of the active gauge plate, so that when the slide $F^{13}$ is shifted to bring the other gauge plate into action, the shoe will be moved slightly up or down according to the position in which said plate happens to be adjusted. Such vertical movement of the shoe $F^{17}$ is transmitted to the selecting bridge $F^2$ through the medium of the depending arm $F^{10}$ of the rock shaft $F^8$ and causes a corresponding adjustment of the cross rib $f$.

Figure 3:
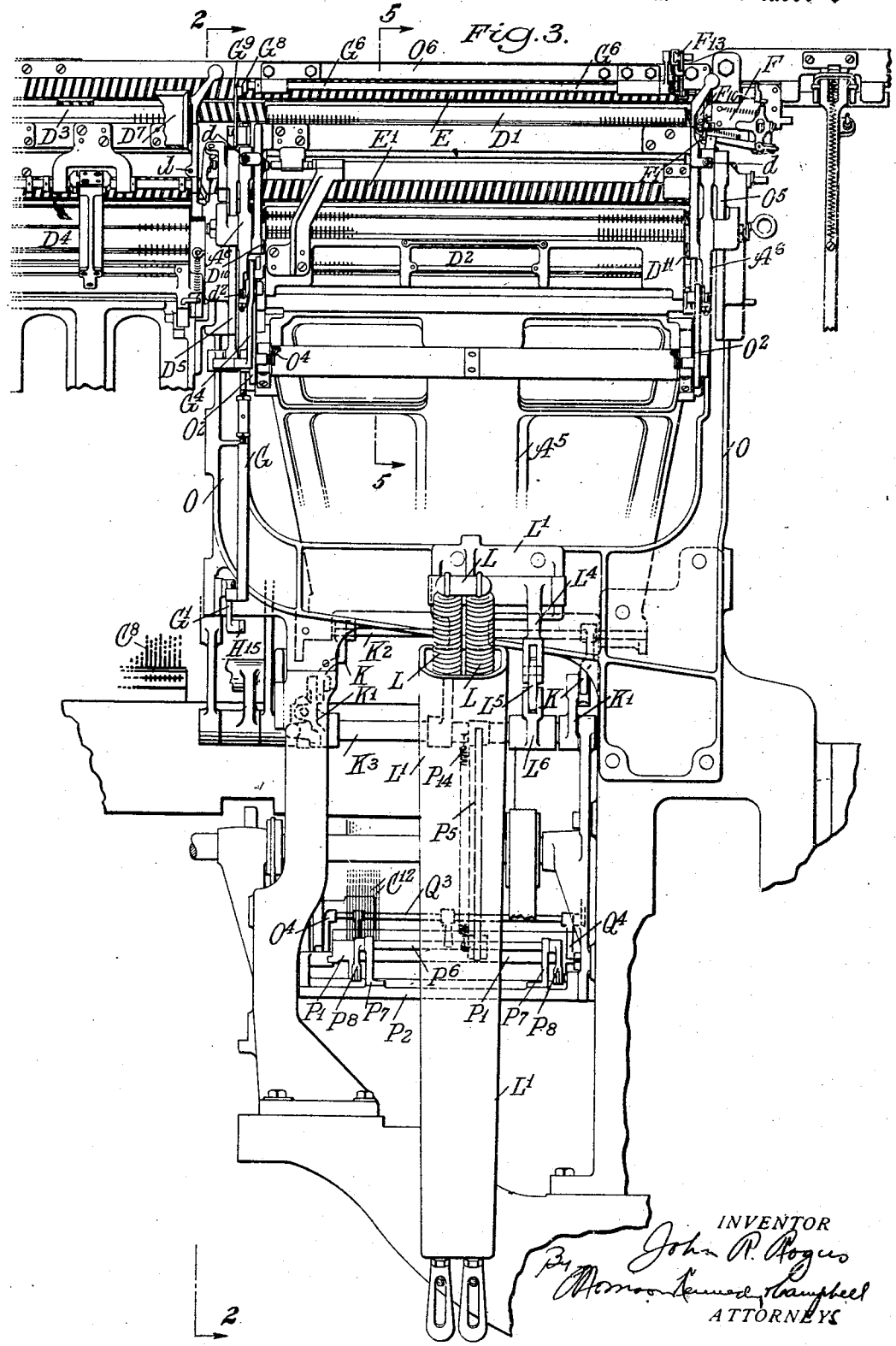
Fig. 3 is a rear elevation of the parts shown in Fig. 1.
Figure 7:
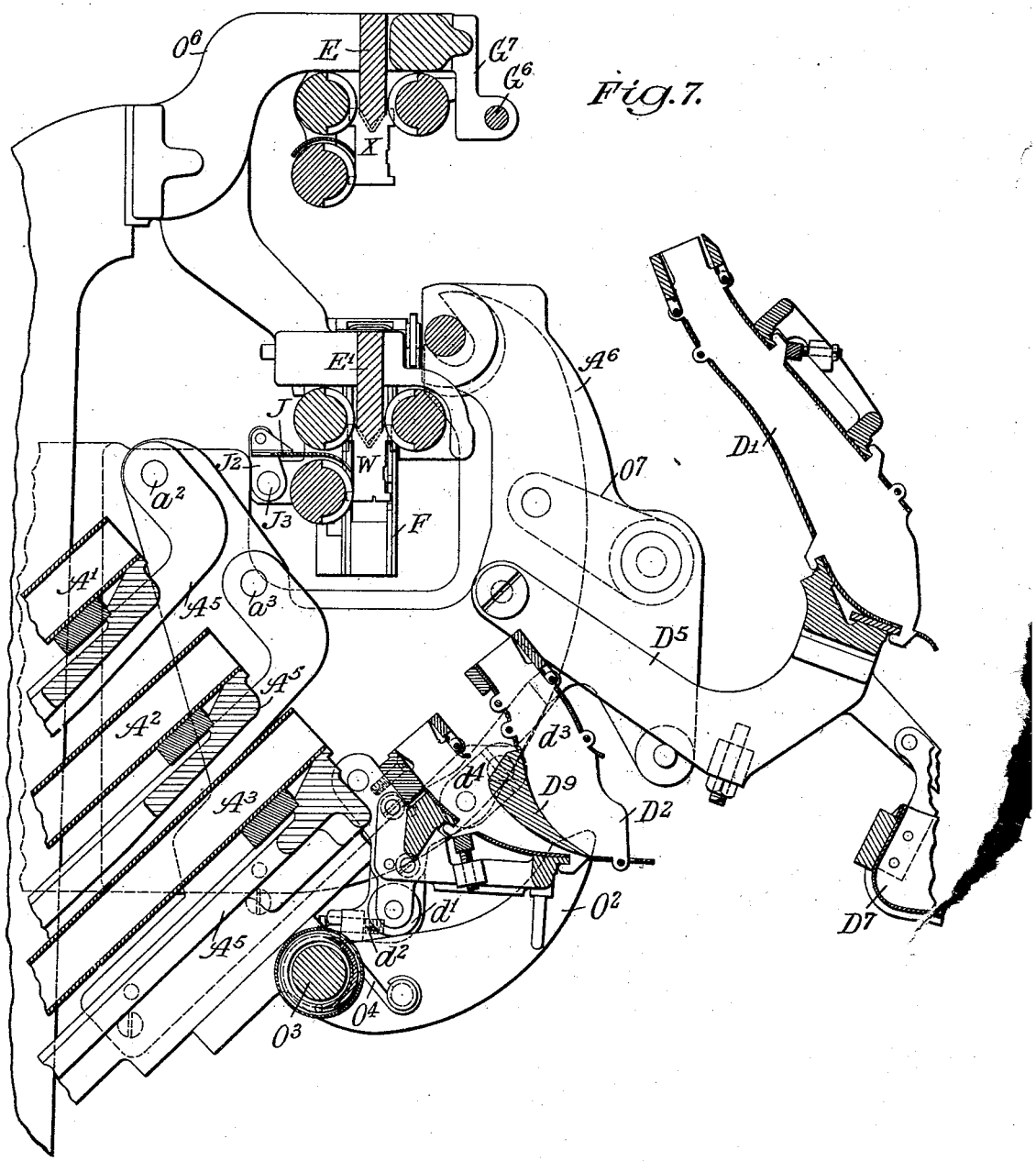
Fig. 7 is a vertical section through the distributing mechanism and the upper portion of the magazines, showing the magazine entrances swung to the rear for access to the parts.

The magazine entrances $D^1$ and $D^3$ for the upper main and upper auxiliary magazines, respectively, as in my pending application, Ser. No. 356,677, filed April 20, 1929, are arranged in front of the lower distributor $E^1$ and are so mounted that they may be swung independently back and forth between the distributors when access to the interior parts is desired, the upper main magazine entrance $D^1$ being supported by a pair of depending arms $D^5$ pivoted at their lower ends to rigid extensions $A^6$, which rise from the upper end of the lowermost base frame $A^5$ at opposite sides thereof, and the upper auxiliary entrance $D^3$ being similarly supported by a pair of depending arms $D^6$ (Fig. 3) pivoted to fixed brackets $O^1$ secured to the distributor frame $O$. Both of said entrances, as may be observed, are disposed well forward of their pivotal axes and, consequently, their weight is sufficient to maintain them in their operative position without other means of support, each entrance being provided with stop screws $d$ mounted in their depending arms $D^5$, $D^6$, which serve to locate them in proper relation to the upper distributor E. Weighted trays $D^7$, $D^7$ are also provided, which are suspended from small bracket arms $D^8$ secured to the entrances at opposite sides thereof, and are adapted, when the entrances are swung rearwardly (as shown in Fig. 7), to catch any matrices that might at the time be lodged in one or more of their channels. The lower auxiliary magazine entrance $D^4$, which is shown in Fig. 3 only, may be identical in form and arrangement to the corresponding entrance described in the pending application above mentioned and to which reference may be had if desired.

Figure 6:
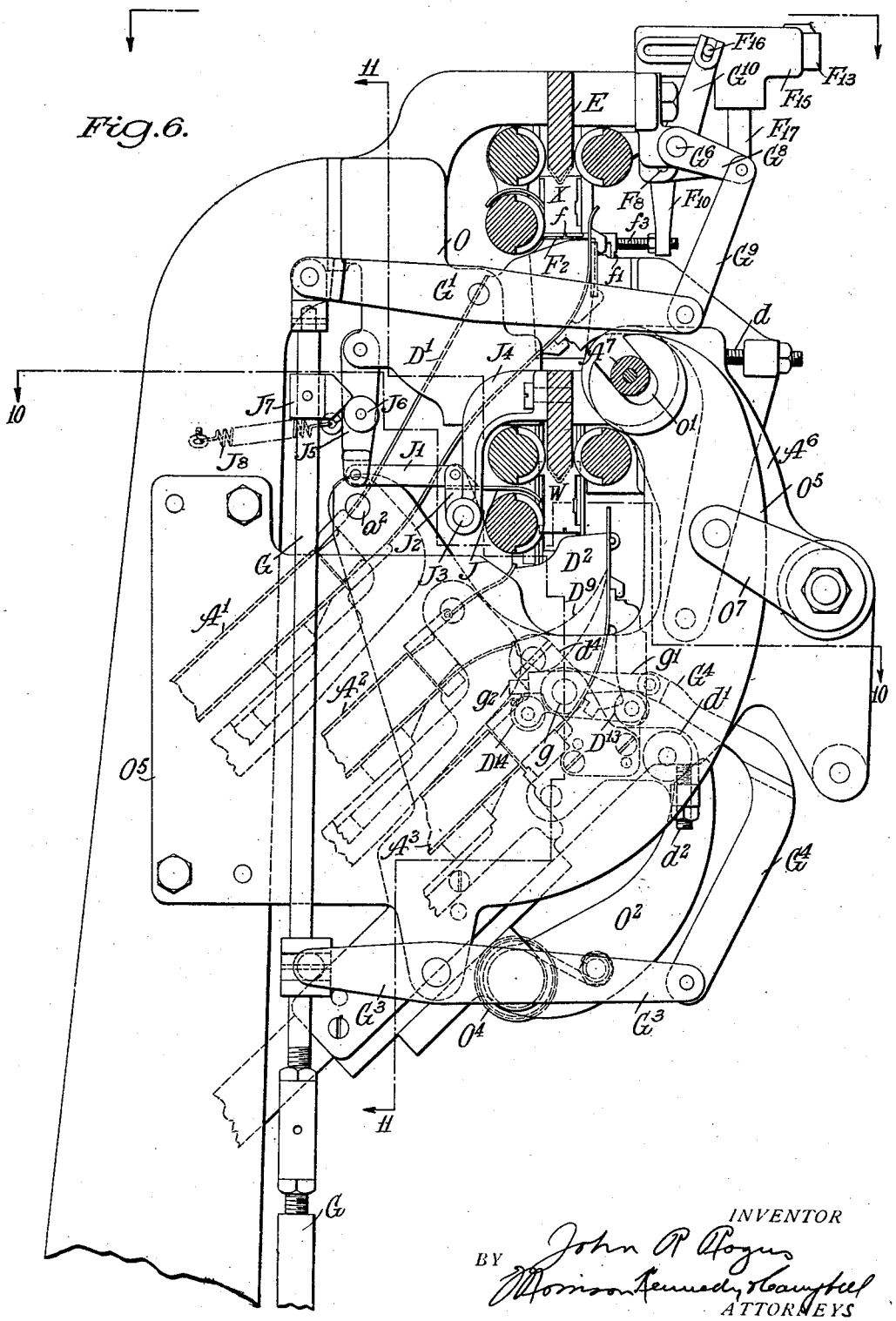
Fig. 6 is a view similar to Fig. 5, showing certain of the moving parts in a different position.

The lower main magazine entrance $D^2$ is pivoted or hinged at its opposite sides to the rigid extensions $A^6$ of the lowermost magazine base frame $A^5$ in such manner that it may be swung rearwardly and downwardly at will from its operative position without interference with the upper magazine entrance $D^1$. In this case, however, due to the location of its pivotal axis, the entrance $D^2$ must be sustained in its operative position, and, hence, there is provided (see Fig. 6) a pair of short retaining arms or fingers $O^2$ journaled on a fixed horizontal rod $O^3$ and arranged adjacent the inner faces of the extensions $A^6$. These arms $O^2$ are held under the tension of torsion springs $O^4$, coiled around the rod $O^3$, against anti-friction rollers $d^1$ carried at the opposite sides of the entrance, and they are not only intended to hold the entrance resiliently in its operative position, but also serve to counterbalance the weight of the same as it is swung to and fro. The entrance $D^2$ is also provided with adjustable stop screws $d^2$, which (as shown in Figs. 3 and 6) are adapted to engage the lower edge of the extensions $A^6$ when the entrance is swung upwardly into operative position.

According to the present invention, the magazine entrance $D^2$ is common to both of the regular magazines $A^2$, $A^3$, being provided with a passage $d^3$ leading to the middle magazine $A^2$, and a second passage $d^4$ leading to the lower magazine $A^3$. Between these passages, there is arranged a gate or switch $D^9$ (Figs. 5 and 6) adapted in one position to shut off the passage $d^3$ and establish a connection between the distributor $E^1$ and the lower magazine $A^3$, and in its other position to close the passage $d^4$ and establish a connection between the middle magazine $A^2$ and said distributor. The switch $D^9$ (as best shown in Figs. 3 and 11) is provided with end bearing portions $D^{10}$, $D^{11}$, journaled on studs $D^{12}$, which project inwardly from lugs $d^5$ rising from the entrance frame. The end portion $D^{10}$ at the right of the switch is provided with two anti-friction rollers $D^{13}$, $D^{14}$, which are mounted respectively on arms projecting radially from the bearing portion $D^{10}$.

The operation of the switch is effected by means of a long vertically movable link or rod G connected at its upper end to a fore-and-aft rocking lever $G^1$, pivoted to the distributor frame O, and at its lower end to the horizontal arm of a small bell crank lever $G^2$ also pivoted to the distributor frame. About midway of its length, the rod G is loosely connected to a rocking lever $G^3$, similar to the lever $G^1$ and which is mounted on a lug $o$ projecting downwardly from the lower edge of one of a pair of fixed brackets $O^5$, secured respectively to the upright side members of the distributor frame O. The rear end of the lever $G^3$ is connected by means of an intermediate angular link $G^4$ to a switch actuating member $G^5$, pivotally mounted on a bearing stud $g$ protuding from the inner face of the right-hand bracket $O^5$. The actuating member $G^5$ (see Figs. 5 and 10) is pivoted between its ends so as to present a pair of arms $g^1$, $g^2$ of different lengths, and is located immediately adjacent the end bearing portion $D^{10}$ of the switch $D^9$ (Fig. 7), the pivot screw for the actuating member being aligned with the axis of the switch, and the arms $g^1$, $g^2$ being disposed in operative relation to the respective rollers $D^{13}$, $D^{14}$.

The arrangement is such that, by raising the rod G, the member $G^5$ will be rocked by the link $G^4$ in a clockwise direction (as viewed in Fig. 5) and the longer arm $g^1$ thereof caused to engage and depress the roller $D^{13}$. This operation swings the switch bodily toward the rear to close the branch passage $d^4$ and open up the passage $d^3$ (see Fig. 6). Conversely, when the rod is lowered, the actuating member $G^5$ will be rocked in the opposite direction by the link $G^4$ and the shorter arm $g^2$ of said member caused to engage and depress the roller $D^{14}$, thereby swinging the switch forwardly to close the passage $d^3$ and open the passage $d^4$ (see Fig. 5). Matrices released by the lower distributor bar may thus be directed into one or the other of the magazines $A^2$, $A^3$ according to the position of the rod G. It may be stated at this point that, since the actuating member is mounted independently of the entrance $D^2$, its operation to adjust the switch may take place while the entrance is in its lower or inactive position. In this event, however, and irrespective of the position of the switch at the time the entrance is lowered, the switch will be properly adjusted automatically by the engagement of one or the other rollers $D^{13}$, $D^{14}$ with the actuating member $G^5$ when the entrance is swung upwardly into active position.

Figure 27:
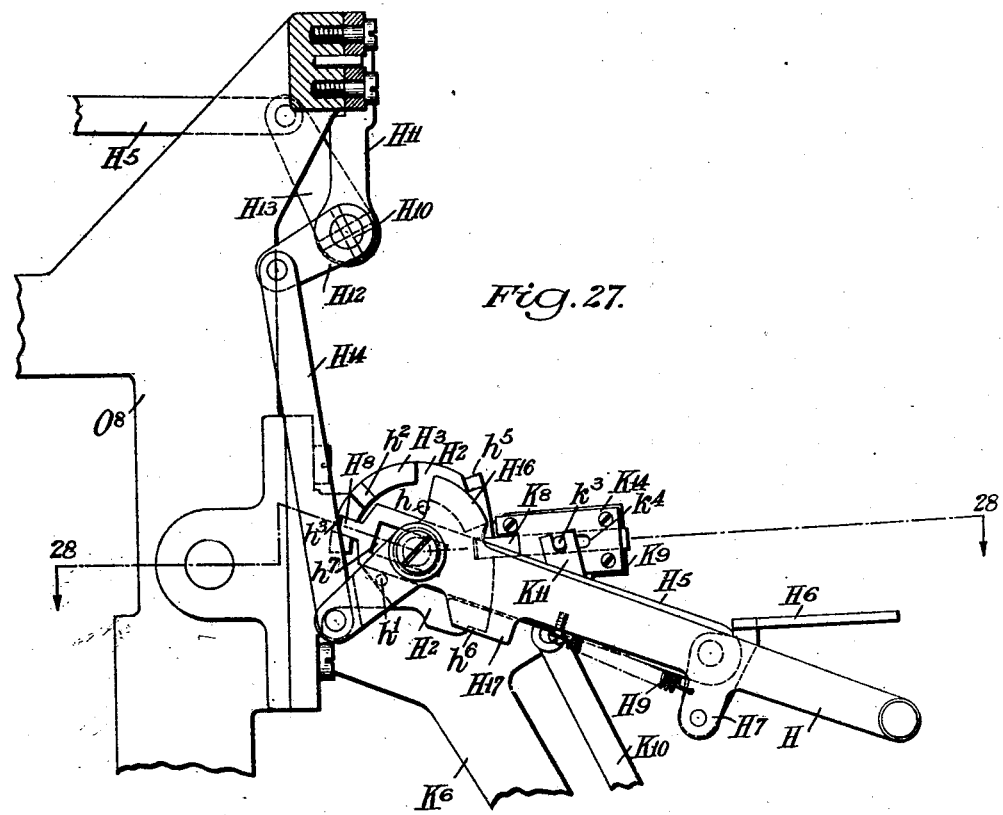
Fig. 27 is a side elevation of the mechanism shown in Fig. 24.
Figure 28:
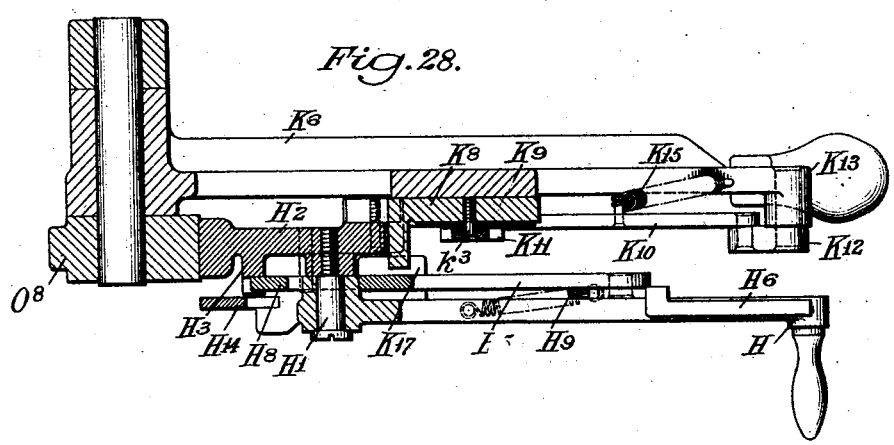
Fig. 28 is a horizontal section taken on the line 28—28 of Fig. 27.

The vertical movement of the rod G is controlled by a hand lever H located conveniently at the front of the machine and pivotally mounted on a horizontal stud $H^1$, projecting from one side of a fixed supporting block $H^2$ fastened to the main frame. At the top, the block $H^2$ is formed with a segmental flange $H^3$ concentric with the axis $H^1$ and having a pair of radial notches $h^2$, $h^3$, and at the front, the block is formed with a segmental portion $H^4$ described on a different radius and which presents a central notch $h^4$ and upper and lower shoulders $h^5$, $h^6$, the purpose of which will later appear. In order to maintain the hand lever H in its adjusted positions (see Figs. 27 and 28), it is provided with a longitudinally movable latch bar $H^5$ disposed alongside of the same and connected at its forward end to a grip member $H^6$, which is pivoted to a lug $H^7$ projecting from the lower edge of the lever. The latch bar $H^5$ is formed at its rear end with a nose portion $H^8$ for engagement with the notches $h^2$, $h^3$ and adjacent this point with a rectangular slot $h^7$ by means of which it is supported and guided on the pivot stud $H^1$. A pull spring $H^9$, connected to the grip member $H^6$ and anchored to the hand lever, is also provided and tends constantly to press the latch bar $H^5$ to the rear and hold the nose portion $H^8$ thereof resiliently engaged with one or the other of the notches $h^2$, $h^3$. The hand lever H is thus locked in different positions but may be released at will preparatory to adjustment by depressing the grip member against the tension of the spring $H^9$ to withdraw the latch member from engagement with the flange $H^3$. The pivotal movement of the hand lever, as may be observed (see Fig. 27), is limited by a pair of stop pins $h$, $h^1$, which protrude from the block $H^2$ into the path of the latch bar $H^5$ and are adapted to locate the nose portion $H^8$ of said bar in engaging relation to one or the other of the notches $h^2$, $h^3$.

The connections between the hand lever H and the rod G consist of a short horizontal rock shaft $H^{10}$ journaled above the hand lever in a fixed bracket $H^{11}$ and provided at its opposite ends with crank arms $H^{12}$, $H^{13}$ respectively, the crank arm $H^{12}$ being connected by a vertical link $H^{14}$ to the rear end of the hand lever H, and the crank arm $H^{13}$ being connected by a fore-and-aft link $H^8$ to the vertical arm of the bell crank lever $G^2$ before mentioned. Through these connections, the hand lever when swung upwardly is adapted to raise the rod G and when swung downwardly to lower said rod. If, by an adjustment, the lever H is shifted from its upper to its lower position (Fig. 25), the rod G in moving downwardly causes the switch $D^9$ to be swung forwardly to connect the lower distributor $E^1$ with the lower magazine $A^3$; and when the hand lever is shifted back to the position shown in Fig. 24, the switch, by an upward movement of the rod G, is rocked rearwardly to connect the lower distributor to the second magazine $A^2$. As the grip member $H^6$ is released, the spring $H^9$ is allowed to pull the latch bar $H^5$ into engagement with the aligned notch in the flange $H^3$ so as to lock the hand lever and thus sustain the switch through the rod G in its operative position.

The gauge plates $F^{11}$ and $F^{12}$ will, of course, be set to correspond to the particular fonts contained in the respective magazines $A^2$, $A^3$, and in order that these fonts may be properly distributed, the bridge $F^2$ should be adjusted according to the position of the switch $D^9$. In other words, when the switch is shifted to effect a change of connection between the distributor $E^1$ and one or the other of said magazines, the slide $F^{13}$ carrying the gauge plates should also be shifted to effect a corresponding adjustment of the bridge so that matrices delivered to the lower distributor under the control of the bridge will be distributed to the proper magazine.

As another feature of the invention, therefore, it is proposed to adjust the bridge $F^2$ simultaneously with the switch $D^9$ by a single operation of the hand lever H, it being understood that the gauge plate $F^{11}$ will be set for the matrix font contained in the middle magazine $A^2$ and the gauge plate $F^{12}$ for the font contained in the lower magazine $A^3$. To this end, means are provided for operatively connecting the vertical rod G, through which the switch $D^9$ is operated, to the slide $F^{13}$ which controls the adjustments of the bridge. Such means, as clearly shown in Figs. 3 and 5, consists of a horizontal rock shaft $G^6$ arranged alongside the upper distributor E at the rear thereof and journaled in a pair of brackets $G^7$ secured to the cross member $O^6$ of the distributor frame. At the extreme left (according to Fig. 3), the shaft $G^6$ is provided with a crank arm $G^8$, which is connected by a link $G^9$ to the rear end of the upper rocking lever $G^1$, and at the extreme right the shaft is provided with an upright arm $G^{10}$, which is loosely connected to a pin $F^{16}$ attached to the slide $F^{13}$ and projecting through a slot in the extension $F^{15}$.

Figure 5:
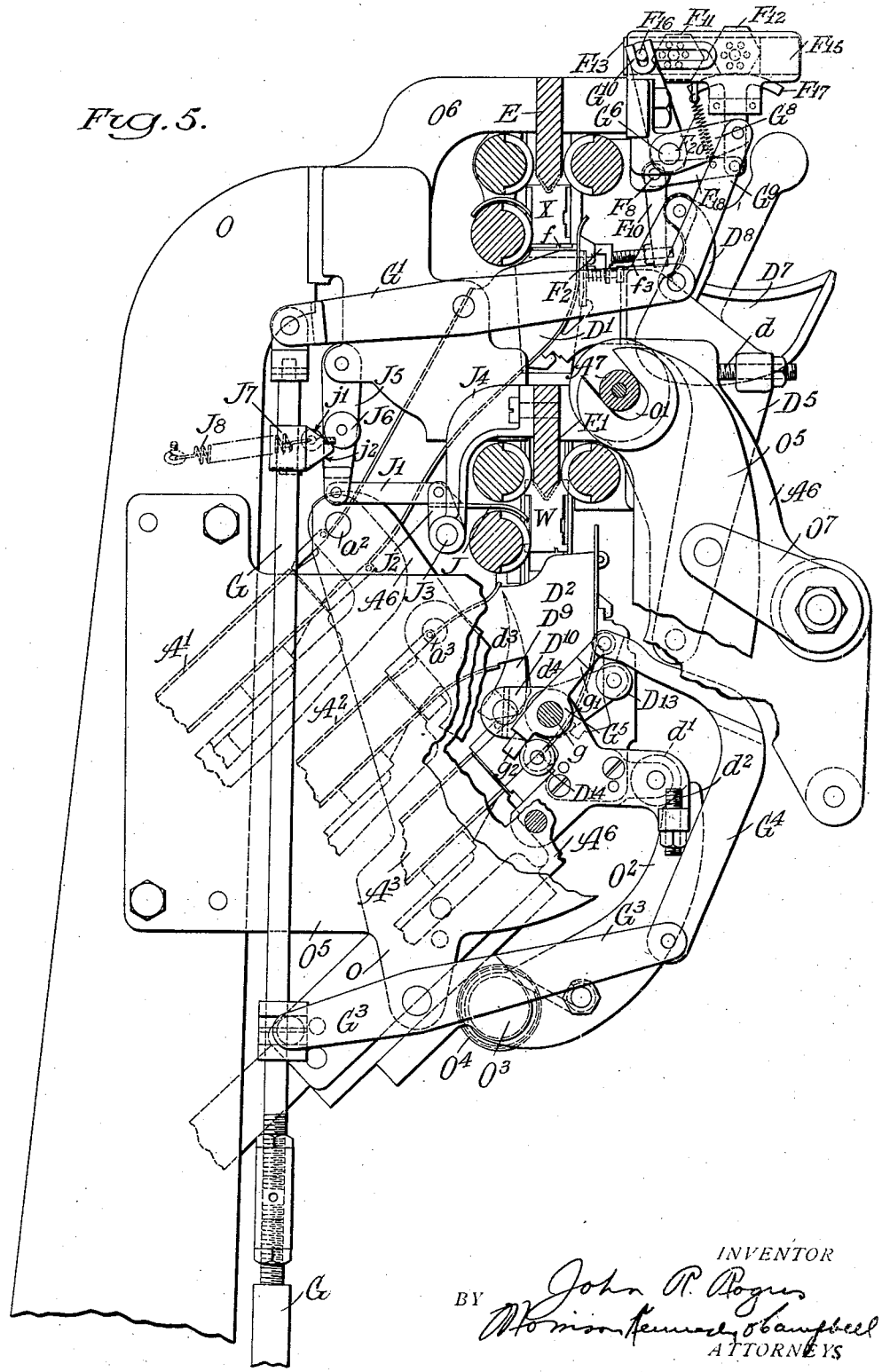
Fig. 5 is a vertical section through the distributing mechanism with part of the framework broken away to expose certain moving parts.

It will now be seen that when the hand lever H is raised to rock the switch rearwardly from the position shown in Fig. 5 to that shown in Fig. 6, the slide $F^{13}$, through the rock shaft $G^6$ and the rocking lever $G^1$, will also be pushed rearwardly by the arm $G^{10}$ to carry the gauge plate $F^{11}$ into engagement with the actuating shoe $F^{17}$. This operation depresses the shoe and adjusts the bridge $F^2$ forwardly to the position shown in Fig. 6, the rib $f$ thereof at such time being located to register with the font notches formed in the matrices belonging to the magazine $A^2$. When however the hand lever H is lowered to reverse the position of the switch $D^9$, the slide $F^{13}$ through the same connections will be shifted in the opposite direction to bring the gauge plate $F^{12}$ into engagement with the actuating shoe $F^{17}$. The latter, at this time, is allowed to rise slightly under the influence of the spring $F^{20}$ in making contact with the plate $F^{12}$ and, through the rock shaft $F^8$, moves the bridge sustaining screw $f^3$ in the depending arm $F^{10}$ a corresponding distance to the rear, the bridge spring $F^7$ serving to move the bridge under the control of said screw also to the rear and thus to locate the rib $f$ in the proper position to register with the font notches formed in matrices belonging to the lower magazine $A^3$.

To prevent the operation of the switch $A^7$ while matrices handled by the lower distributor $E^1$ are in course of distribution, safety means are provided in the form of a detector plate or feeler J, which (as shown in Figs 5 and 6) is arranged between the two front screws of the distributor $E^1$ above the magazine entrance $D^2$ and is provided with a rigid arm $J^1$ projecting forwardly therefrom. At its opposite ends, the feeler is supported by a pair of short upright arms $J^2$ fastened to a rock shaft $J^3$ which is journaled in a pair of brackets $J^4$ secured to the lower distributor bar. The free end of the rigid arm $J^1$ is pivotally connected to a link $J^5$, depending from the cross member $O^6$ of the distributor frame, and is adapted to be swung back and forth to project and withdraw the feeler J into and out of the path of a matrix supported by the lower distributor bar. The link $J^5$ is operated by a V-shaped cam member $J^7$ carried by the vertical rod G and presenting a pair of beveled cam surfaces $j^1$, $j^2$. The cam member $J^7$ is located in front of a roller $J^6$ carried by the link $J^5$ and which is held resiliently engaged with one or the other of the cam surfaces $j^1$, $j^2$ (according to the position of the rod G), by a pull spring $J^8$ connected to the link $J^5$ and anchored to the distributor frame O. However, when the rod G is moved up or down to shift the position of the switch $D^9$, the apex of the V-shaped cam member will pass through the plane of the roller $J^6$ and thus actuate the link $J^5$, which in turn, by means of the connecting arm $J^1$, reciprocates the feeler J.

In the lower position of the rod G (see Fig. 5), the roller $J^6$ will be engaged with the upper cam surface $j^1$ so as to prevent any upward movement of the rod (and a consequent adjustment of the switch) when the operation of the link is resisted by the engagement of the feeler with a matrix or matrices on the distributor bar; and in the upper position of the rod (see Fig. 6), the roller $J^6$ will be engaged with the cam surface $j^2$ so as to serve in like manner and under the same conditions to prevent a downward movement of the rod and a readjustment of the switch. As a result of the foregoing arrangement, the adjustments of the switch $D^9$ may only be effected when the lower distributor bar is clear, and hence any danger of distributing matrices of the two regular fonts W into the wrong magazine is eliminated. Moreover, the several magazines $A^1$, $A^2$, $A^3$ may be instantly connected in different selected pairs ($A^1$ and $A^2$ or $A^1$ and $A^3$) to the respective distributors E, $E^1$, and at the same time the font selecting bridge $F^2$ adjusted so as to sort the matrices of the fonts thus selected and direct them to the proper distributors for final distribution.

In the present type of so-called "mixing machine", it is important that an operative relation between the magazine entrances and the distributors be maintained during the shifting of the magazines for interchange, so that distribution of the matrices may be carried on continuously and in the manner required. For this reason, the auxiliary magazines $A^4$ (following a well-known procedure) are mounted to swing about independent axes located immediately below the corresponding distributors, the entrances moving with the magazines and mounted on the respective base frames. In the present instance, however, the main magazines $A^1$, $A^2$, $A^3$, like those shown and described in my pending application before referred to, are all mounted in a common supporting frame (see Fig. 2), which consists of the lowermost base frame $A^5$, with its upper extensions $A^6$, and the two upper base frames $A^5$, pivoted respectively at $a^2$, $a^3$ to the said extensions. This supporting frame or "shift-frame" (as it may be called) is mounted at its upper end on trunnions $A^7$, whereby it may swing upwardly and downwardly to bring one or the other of the main magazines in operative relation to the assembler throat B and the escapement levers $C^1$. The trunnions $A^7$ project laterally from the extensions $A^6$ at a level intermediate the levels of the two distributors E, $E^1$ at the rear thereof (see Figs. 5 and 6) and are mounted in open bearings $o^1$ formed in the fixed supporting bracket $O^5$, which, as before stated, are secured to the distributor frame O. The particular location of the pivot points thus provided for the shift frame is intended to minimize the movement of the upper ends of the entrances $D^1$ and $D^2$ relatively to the respective distributors E and $E^1$ during the swinging of the magazines, but in order more fully to compensate for this relative movement, there is provided a pair of suspension links $O^7$, carried by the fixed brackets $O^5$ and connected to the extensions $A^6$, for causing at such times a bodily shifting of the pivotal axis $A^7$. In other words, as the magazines are swung downwardly to bring the upper magazine $A^1$ into operative position, the links $O^7$ cause the upper rear portion of the shift frame to move bodily upward as permitted by the open bearings $o^1$, and as the magazines are swung upwardly to bring either of the lower magazines $A^3$ into operative position, the links allow this portion of the frame to move bodily downward in seeking its original position. In this way, by causing the magazine shift frame to turn about a bodily shiftable axis, the magazine entrances $D^1$ and $D^2$ are maintained in proper matrix receiving relation to the respective distributors E and $E^1$ at all times as required. Moreover, the lower ends of the magazines are caused to clear the assembler entrance B in the up and down movements of the shift frame.

The mechanism for swinging the magazines is herein shown only in connection with the series of main magazines $A^1$, $A^2$, $A^3$, since the same mechanism or any other suitable mechanism may be used for shifting the auxiliary magazines. This mechanism (see Figs. 2, 3, 13 and 14) consists essentially of a toggle system adapted to raise the shift frame as it is extended and to lower said frame as it is collapsed. In the preferred embodiment illustrated, two pairs of links K, $K^1$ are employed, which are arranged beneath the lowermost magazine base frame $A^5$ at the opposite sides thereof. The upper links K are suspended from a transverse pivot rod $K^2$ carried between lugs $a^4$ depending from said frame, and are pivotally connected by cross-pins $k$ to the free ends of the lower links $K^1$, the latter being fixedly mounted on a horizontal rock shaft $K^3$ journaled in the side brackets $O^8$ of the main frame. The lower link $K^1$ at the right is formed with a pair of lateral projections or ears $k^1$ (best seen in Fig. 2) and between which is arranged the upper end of a rocker arm $K^4$ mounted loosely on the shaft $K^3$ adjacent said link. At the rear, the rocker arm K⁴ is provided with a stop screw k² and at the front is connected by means of a link K⁵ to the shorter arm K⁷ of a hand lever K⁶, whereby the arm K⁴ may be swung to and fro and through the adjacent toggle link K¹ rock the shaft K³ to extend and collapse the toggle system.

The hand lever K⁶ (see Figs. 14 and 28) is mounted in the right side bracket O⁸ and is arranged conveniently adjacent the hand lever H and the fixed block H², hereinbefore described, being provided with an angular latch member K⁸ arranged to engage the shoulders h⁵, h⁶ and the intermediate notch h⁴ formed in the front segmental portion of the block H². The latch member K⁸ is slidably mounted in an ear K⁹ rising from the upper edge of the lever K⁶ and is operatively connected to a control rod K¹⁰ through the medium of a small bell crank lever K¹¹. The rod K¹⁰ at its lower end (see Fig. 23) is suspended by means of a thumb piece K¹² from a lug K¹³ formed on the lever K⁶, and at its upper end is pivotally attached to one arm of the bell crank lever K¹¹. The other arm of the lever K¹¹ is loosely connected to a pin k³ carried by the latch member K⁸ and projecting therefrom through a slot k⁴ in the retaining plate K¹⁴. A pull spring K¹⁵, connected to the rod K¹⁰ and anchored to the lug K¹³, tends constantly to swing the upper arm of the bell crank lever K¹¹ rearwardly and hold the pin k³ resiliently engaged with the corresponding end wall of the slot k⁴. At such times, the latch member K⁸ is adapted by its engagement with one of the shoulders h⁵, h⁶ or the notch h⁴ to lock the hand lever K⁶ in one or another of its different positions, but may be withdrawn at will against the tension of the spring K¹⁵ to release the lever by depressing the thumb piece K¹².

When the hand lever K⁶ is swung inwardly or rearwardly, the short arm K⁷ thereof draws the connecting link K⁵ and rocker arm K⁴ forwardly to extend the toggle system and raise the shift frame, whereas when the hand lever is swung outwardly or forwardly, the link K⁵ and arm K⁴ are forced rearwardly to collapse the toggles and lower said shift frame. In the extended position of the toggle system (see Fig. 13), the stop screw k² banks against a finished surface o² of the right side bracket O⁸ to locate the lowermost magazine A³ in operative relation to the assembler throat B, and in the collapsed position thereof (see Fig. 2), the shift frame is supported directly on a pair of set screws o³, which are adjustable to locate the top magazin A¹ in operative position.

Figure 4:
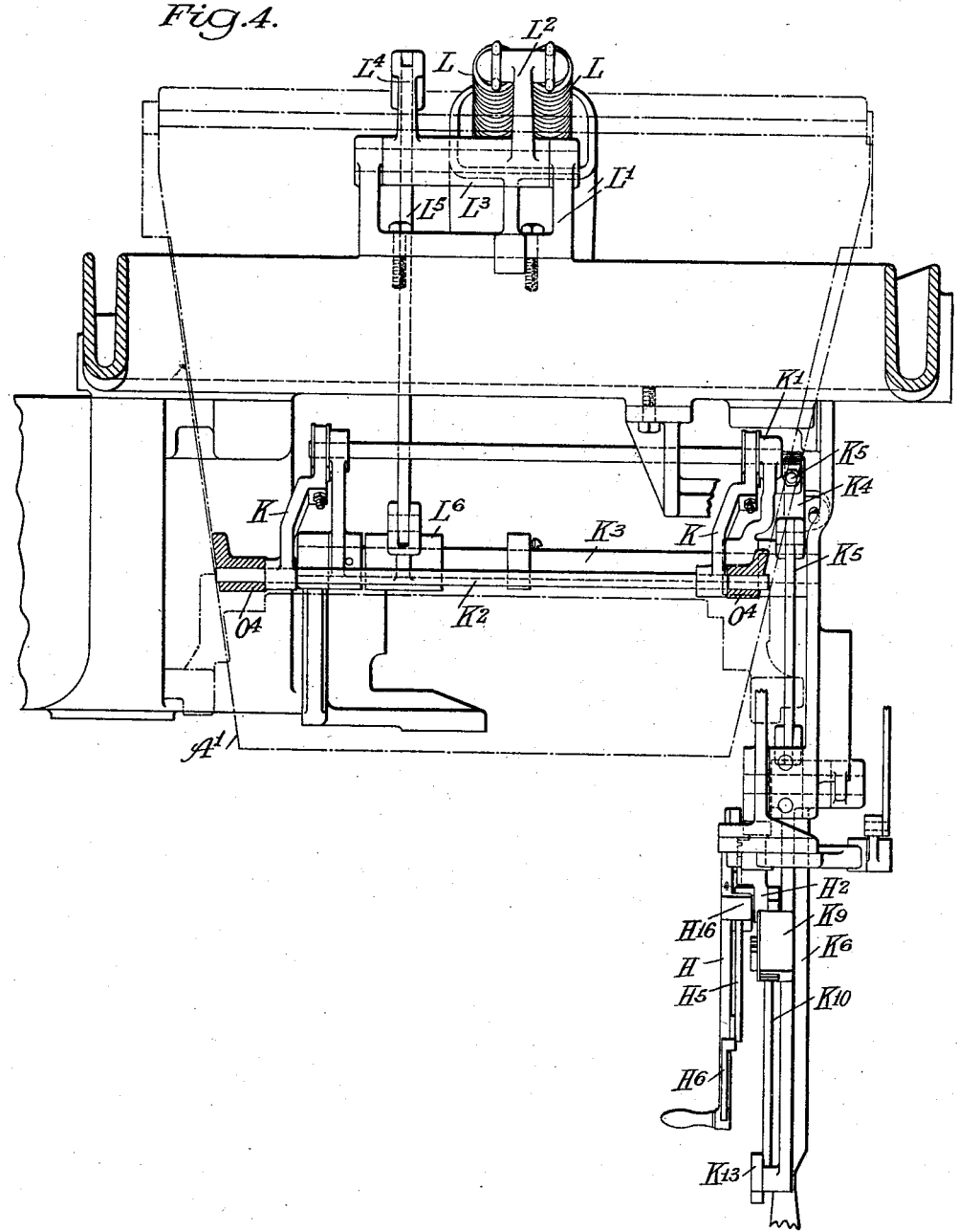
Fig. 4 is a horizontal section taken on the line 4—4 of Fig. 2.

To counterbalance the suspended weight of the magazines and shift frame during the swinging operations and to thereby facilitate the operation of the hand lever K⁶, there is provided a pair of heavy pull springs L, which (as shown in Figs. 2 and 3) are arranged out of the way at the rear of the machine in an elongated bracket L¹ secured to the distributor frame O. The springs L at their lower ends are anchored to adjusting rods l at the foot of the bracket L¹ and at their upper ends are connected to an arm L², which projects rearwardly from a sleeve L³ (Fig. 4) journaled on a stub shaft mounted in the bracket L¹ at the top. The sleeve L³ is provided with another arm L⁴ which projects downwardly therefrom and is connected by a link L⁵ to a crank arm L⁶ rising from the rock shaft K³. Through these connections, the power of the springs L is transmitted to the toggle system and thence to the shift frame as it is raised and lowered.

In selecting the top or first magazine for use, the hand lever K⁶ is swung forwardly until the latch member K⁸ is brought to register with the upper shoulder h⁵ of the block H². The toggle system is thus collapsed and the shift frame swung downwardly to rest upon the set screws O³ (Fig. 2), the springs L being placed under their greatest tension by this operation due to the upward movement of the arm L². As the latch member K⁸ is released and allowed to engage the shoulder h⁵, the shift frame will be locked down upon the stop screw o³ against the opposition of the springs L, and the magazine A¹ thus located in proper relation to the assembler throat B. When the hand lever K⁶ is swung rearwardly to bring the lowermost magazine A³ into operation, the latch member K⁸ is caused to register with the lower shoulder h⁶ of the block H², and while the springs L assist in expanding the toggles to facilitate the lifting of the shift frame, the opposed weight is sufficient to overbalance the resistance of the springs at the time the stop screw k² banks against the bracket O⁸, so that the latch member in engaging the shoulder h⁶ serves to lock the shift frame in its raised position and thereby locates the magazine A³ in correct relation to the throat B (see Fig. 14). In selecting the middle or second magazine A² for use, the hand lever K⁶ is shifted to an intermediate position to allow the latch member K⁸ to engage the notch h⁴ of block H², whereby the hand lever is locked against movement in either direction and the latch member alone relied upon to locate the magazine A² in its operative position. At this time, the weight of the magazine unit and the force of the springs L are intended to be about perfectly balanced, so that comparatively little strain is transmitted to the latch K⁸.

The hand lever K⁶ is thus, operable to bring any one of the three magazines A¹, A², A³ into operative position, but since only two magazines may be connected at a time to the distributing mechanism, only one or the other of the pair so connected should be brought into use. That is to say, when the hand lever H is locked in the adjusted position shown in Fig. 24, the first and second magazines A¹ and A² will be available for use to the exclusion of the magazine A³; whereas when said lever is locked in its other adjusted position shown in Fig. 25, the first and third magazines A¹ and A³ will be available for use to the exclusion of the second magazine A². As a simple expedient to prevent either of the magazines A² and A³ from being inadvertently swung into operative position by the hand lever K⁶ at times they are disconnected from the distributor E¹, the hand lever H is provided with upper and lower lateral projections H¹⁶, H¹⁷, which terminate in flush relation with the opposing side face of the block H² directly in the path of the latch member K⁸, and the latter, as will be noted (see Figs. 25 and 26), is extended sufficiently beyond this side face of the block to cooperate with the projections.

The parts are so arranged that when the lever H is adjusted to connect the first and third magazines to the distributors, the upper projection H¹⁶ will close one end of the notch h⁴, and the lower projection H¹⁷ will be located a considerable distance below the shoulder h⁶ (see Fig. 25). Consequently, while the latch member K⁸ by operation of the hand lever K⁶ may be engaged with either of the shoulders h⁵ or h⁶ to lock the shift frame and the first or third magazine in operative position, the projection H¹⁶ prevents the engagement of the latch with the intermediate notch h⁴ and will thus frustrate an attempt to locate the second magazine A² in operative position. By the other adjustment of the hand lever H (see Fig. 24) to connect the first and second magazines to the distributors, the upper extension H¹⁶ is moved to a neutral position between the notch h⁴ and shoulder h⁵, and the lower extension H¹⁷ is brought into flush relation to the lower edge of the block H². At such time, the extension H¹⁷ will be disposed directly in the path of the latch member K⁸ and will prevent its engagement with the shoulder h⁶ for the locking of the third magazine in operative position. In this way, it is possible to select for use only one or the other of the particular pair of magazines connected to the two distributors, thereby preventing the delivery of matrices to the wrong magazine.

In order to insure accurate vertical registration of the magazines with the assembler throat B in the different locked positions of the hand lever, the latter (as will be noted, see Fig. 2) is adjustably connected to the rock shaft K³ by a pair of opposed set screws k⁵ mounted in the ears k¹ of the lower toggle link K¹, and which clamp against the opposite edges of the rocker arm K⁴ at the upper end thereof. It may also be noted (see Figs. 4 and 14) that the upper links K of the toggle system are connected to the pivot pins k of the lower links K¹ by means of adjustable bearing blocks k⁶, which are intended to allow a vertical adjustment of the shift frame at its opposite sides in obtaining an accurate horizontal alignment of the magazines with the throat B.

Figure 29:
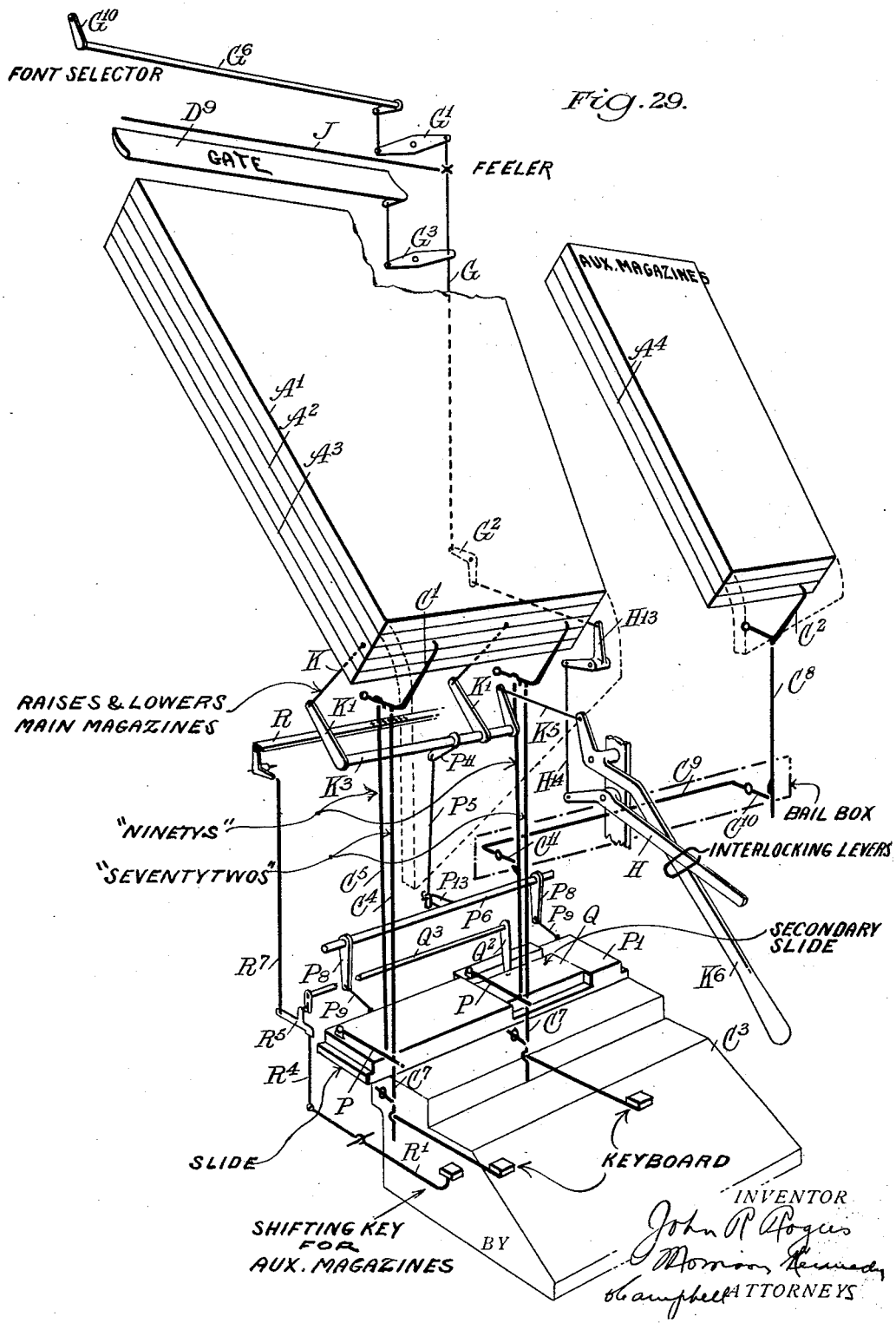
Fig. 29 is a diagram, showing the connections between the escapements of a seventy-two character magazine and the corresponding key-controlled rods.

Since the spacing of the channels of the magazine A¹ is different from that of the magazines A², A³, the location of the escapements C and their actuating plungers c in the two cases will also differ, those of the magazine A¹ being offset from or located in different vertical planes from those of the magazines A², A³. To provide for these varying positions of the parts, the actuating plungers c for the escapements of the magazine A¹ are formed (see Fig. 29) at their forward ends with laterally extending or offset portions so as to be properly engaged by selected levers of the series C¹, as in the prior Kennedy Patent No. 1,397,974. Furthermore, it will be noted (Fig. 30) that the corresponding matrices of the two fonts X and W (that is to say, those bearing the same character) are stored in differently located channels, due to the difference in number and spacing of such channels of the magazines, so that the finger keys of the keyboard cannot act through the same series of connections in effecting the release of like matrices of the different fonts. Means are, therefore, provided whereby different series of connections may be established through which the finger keys may act.

Accordingly, the improved machine is equipped with two sets of vertically disposed reeds C⁴, C⁵, arranged one behind the other and having their lower ends terminating above the keyboard C³. The reeds C⁵ (ninety-one in number) of the rear set are substantially straight and have their upper ends arranged to engage all of the escapement actuating levers C¹, whereas the reeds C⁴ (seventy-three in number) of the front set, while having their lower end portions aligned with corresponding reeds of the rear set, are offset in different directions and to different extents to locate their upper end portions in engaging relation to selected levers C¹. In this connection, it may be noted (see Fig. 29) that with the exception of the three reeds connected to the magazine channels containing the respective characters "EM", "Fsp" and "Th", it is merely necessary to bend the reeds to obtain the offset relation desired, the excepted reeds C¹⁵, in order to clear the intervening reeds C⁵, being offset by means of rigid horizontal connecting bars or plates C¹⁶ arranged adjacent the rear edges of the reeds C⁵. In the present instance and as best shown in Fig. 15, the reeds C⁴, C⁵ are operated by a series of fore-and-aft levers P controlled in the usual way by the finger keys of the keyboard through the power operated cam yokes $C^6$ and a single series of short reed sections or rods $C^7$ (see my prior Patent 1,717,411).

The levers P are pivotally mounted and guided at their rear ends in an adjustable bar $P^1$, and are formed near their front ends with upward projections $p$. The bar $P^1$ (see Figs. 17, 18 and 19) is mounted in a horizontal supporting frame $P^2$ secured to the side brackets $O^8$ and is slidable forwardly and backwardly therein to locate the projections $p$ of the levers P in operative relation to the front and rear sets of reeds $C^4$, $C^5$, respectively, the bar $P^1$ being sustained by tongues $P^3$ fitted in grooves $P^4$ formed in forward extensions of the supporting frame $P^2$.

Adjacent the brackets $P^7$, the shaft $P^6$ is provided with a pair of depending arms $P^8$, connected by links $P^9$ to corresponding lugs $P^{10}$ projecting downwardly from the rear edge of the bar $P^1$. At the top, the link $P^5$ is pivotally connected to an arm $P^{11}$ secured to the shaft $K^3$, and at the bottom is formed with an elongated slot $P^{12}$ wherein engages a cross pin $p^1$ mounted in the free end of an arm $P^{13}$ located between the arms $P^8$ and projecting rearwardly from the rock shaft $P^6$. A long pull spring $P^{14}$, anchored to the arm $P^{11}$ and connected to the cross pin $p^1$ of the arm $P^{13}$, tends constantly to move the bar $P^1$ rearwardly to maintain the cross-pin engaged with the upper end of the slot $P^{12}$. The movement of the bar in this direction is limited by an abutment $P^{15}$ rising from the frame $P^2$ and opposed to an adjustable stop screw $P^{16}$ mounted in the rear face of the bar $P^1$ and adapted, by its engagement with said abutment, to locate the upward projections $p$ of the levers P in operative relation to the rear set of reeds $C^5$ (see Fig. 18).

According to this arrangement, as the rock shaft $K^3$ is turned by the hand lever $K^6$ in a clockwise direction (as viewed in Fig. 13) to collapse the toggle system and bring the first magazine $A^1$ into operative position, the shaft $P^6$ is rocked by the link $K^5$ in the same direction against the tension of the spring $P^{14}$ and, through the depending arms $P^8$ and links $P^9$, pushes the bar $P^1$ forwardly. When the latch member $K^8$ of the hand lever $K^6$ is brought into register with the shoulder $h^5$ of the block $H^2$, the bar $P^1$ will have been adjusted to its forward position and the levers P carried into operative relation to the front set of reeds $C^4$ (see Fig. 19). A series of connections is thus established between the finger keys of the keyboard $C^3$ and the particular levers $C^1$ for actuating the escapements of the top magazine $A^1$, the locking of the hand lever $K^6$ serving to maintain the bar in its adjusted position. When, on the other hand, the rotary movement of the shaft $K^3$ is reversed to extend the toggles and bring the second or third magazine into operative position, the link $P^5$ will be raised and the rock shaft $P^6$, under the influence of the spring $P^{14}$, will move the bar $P^1$ rearwardly. Then, as the latch member $K^8$ registers with the central notch $h^4$ of the block $H^2$, the stop screw $P^{16}$ of the bar $P^1$ banks against the abutment $P^{15}$ of the frame $P^2$ and locates the levers P in engaging relation to the rear set of reeds $C^5$. A series of connections is now established between the keyboard and all of the levers $C^1$ for actuating the escapements of the magazine $A^2$. Since the latter series of connections is also adapted for the other ninety-one channeled magazine $A^3$, the adjustment of the bar $P^1$ is left undisturbed as the rock shaft $K^3$, by a further adjustment of the hand lever $K^6$, continues its reverse movement to bring the lowermost magazine $A^3$ in operative position, the slot $P^{12}$ at such time, and again when shifting back from the third to the second magazine, allowing the required lost motion to take place between the link $P^5$ and the rock shaft $P^6$. It may be further noted (see Figs. 18 and 19) that, while the levers P are shifted back and forth to make and break connections with the respective sets of reeds $C^4$, $C^5$, they are sufficiently long to maintain their connection with the power operated rods $C^7$ so as to be actuated thereby in one or the other adjusted positions of the frame $P^1$. It will be seen, therefore, that irrespective of which pair of magazines happens to be connected to the distributors, the bar $P^1$ will be automatically adjusted to cooperate with the appropriate set of reeds $C^4$ or $C^5$ when either magazine of the selected pair is swung into operative position.

Attention is now directed to Figs. 15, 20, 21 and 24, which illustrate the manner of operating the escapements of the auxiliary magazines $A^4$ and the means employed for connecting and disconnecting these magazines with and from the keyboard $C^3$. The auxiliary magazines are of the usual rectangular form, each having a given number of parallel matrix channels, which are vertically aligned with the levers $C^2$, so that the latter may be connected thereto through the intervening escapements when one or the other of the magazines is brought into operative relation to the assembler throat B. As is customary in this type of machine (see Fig. 1), the throat B is extended to the right to receive matrices as they are released from these magazines and to direct them onto the horizontal portion of the assembling belt $B^1$ for composition in line.

The levers $C^2$ are actuated by a series of comparatively short vertically movable reeds $C^8$ (Fig. 15), which may be operatively connected to the keyboard $C^3$ through a corresponding number of horizontally arranged U-shaped rocking bails $C^9$. Each of these bails presents a pair of parallel arms $C^{10}$, $C^{11}$ located respectively at the opposite ends thereof and extending forwardly from pivot rods $c^1$. The arms $C^{10}$ have their free ends located in constant engaging relation to lugs $c^2$ projecting from the rear edges of the reeds $C^8$ and the free ends of the other arms $C^{11}$ are located directly behind and in spaced relation to a selected group of the straight reeds $C^5$ comprising the rear set before described. The reeds $C^{12}$ of this selected group are provided with reversely disposed projections $c^3$, which are located below the ends of the arms $C^{11}$ but which are adapted normally to avoid engagement therewith when the said reeds are operated. However, and since the ordinary arrangement of the reeds would permit a limited amount of movement at the top without disturbing their operative relation to the actuating levers P below, the upper ends of the rear set of reeds $C^5$ are mounted in an oscillatory frame R, pivotally mounted in the machine frame and adjustable back and forth to carry the projections $c^3$ of the selected group of reeds $C^{12}$ into and out of engaging relation to the arms $C^{11}$ of the rocking bails.

In the present embodiment, the operation of the frame R is controlled by a finger key $R^1$ pivoted conveniently at the left of the keyboard $C^3$ in a suitable bracket $R^2$ and provided with an auxiliary locking finger $R^3$ suspended therefrom and arranged to engage a lug on the bracket $R^2$ when the key is depressed. At its rear end, the finger key $R^1$ is connected to a vertical slide $R^4$, which abuts at the top against an intermediate fore-and-aft rocker plate $R^5$, pivoted at $R^6$ to the framework and connected by a link $R^7$ to an integral arm $R^8$ projecting rearwardly from the oscillatory frame R. A spring $R^9$, connected to the frame R at one side thereof, tends constantly to move it forwardly and maintain the rocker plate $R^5$ engaged with the upper end of the slide $R^4$. Consequently, and assuming for the moment that the levers P occupy the position shown in Fig. 18 (in operative relation to the rear set of reeds $C^5$), when the finger key R is depressed, the frame R will be rocked rearwardly against the tension of the spring $R^9$, and in carrying the whole rear set of reeds with it, will locate the projections or lugs $c^3$ of the selected group $C^{12}$ in engaging relation to the arms $C^{11}$ of the rocking bails $C^9$.

At this time, the reeds of the selected group are adapted to break connection with the pivoted levers $C^1$ so as to act only upon the bails $C^9$, which are intended to transmit the upward movement of these reeds to the auxiliary reeds $C^8$. For this reason and as will be observed, the particular levers $C^1$ involved are formed with clearance notches $C^{13}$ to receive the upper ends of the reeds $C^{12}$, the remaining levers $C^1$ being formed without these notches so as to maintain their connection with the reeds $C^5$. As a result, while certain of the finger keys of the keyboard may be connected to the escapements of the auxiliary magazines $A^4$, the balance of the keys are allowed to maintain their connection with the escapements of the main magazine $A^2$ or $A^3$, according to which one of the latter is at the time in operative position. By disengaging the locking finger $R^3$, the spring $R^9$ is allowed to restore the frame R and the reeds $C^5$ to their original position, thus disengaging the lugs $C^3$ from the bails $C^9$ and reconnecting the reeds to all of the levers $C^1$. In this way, the keyboard may be caused to release matrices simultaneously from the auxiliary and main magazines then in operation.

It is further proposed, however, in carrying out the invention, to connect the keyboard to an auxiliary magazine when the first or top magazine $A^1$ is in operation, so that the head letter font contained in the auxiliary magazine may be used together with the display font contained in the special magazine $A^1$. This is acomplished (as best shown in Fig. 15) by mounting a group of the levers P (i. e. those vertically aligned with the corresponding group of reeds $C^{12}$) so that they may be shifted independently forward and backward when the supporting bar $P^1$ occupies its forward position of adjustment and the projections $p$ of the levers P are located in operative relation to the front set of reeds $C^4$. The levers P of this group (see Figs. 16 and 17) are carried in a subsidiary slide Q mounted in a recess $P^{17}$ formed in the bar $P^1$, and which is held resiliently against the front wall of said recess by a pair of detents or spring plungers $Q^1$ projecting from the rear edge of the slide and engaging ears $P^{18}$ rising from the fixed supporting frame $P^2$. The auxiliary slide Q is operated by a pair of fingers $Q^2$ depending from a horizontal rock shaft $Q^3$ and engaging the front edge of the slide near the opposite ends thereof. The shaft $Q^3$ (see Fig. 16) is journaled in angular brackets $Q^4$ projecting forwardly from the frame $P^2$ and is extended to the left (Fig. 15) to make connection, by means of a short crank arm $Q^5$, with the rocker plate $R^5$ above mentioned, the latter for the purpose being formed on its upper edge between its ends with an upstanding arm $r$ loosely conected to the crank arm $Q^5$.

The movements of the auxiliary slide Q are thus brought under the control of the finger key $R^1$, so that the group of levers P carried by the slide may be shifted automatically into operative relation to the group of rear reeds $C^{12}$ when the latter are swung into engagement with the rocking bails $C^9$. The locking of the key serves to sustain the slide in its shifted position against the tension of the spring plungers $Q^1$, and the plungers act to return the slide to its former position when the key is released. As before stated, the rocking of the shaft $Q^3$ and the consequent shifting of the slide Q is effected only when the bar P is adjusted forwardly and the first magazine A¹ is in operative position. At other times, that is, when either of the magazines A² or A³ is in use, the bar P occupies its retracted or rearward position, and hence the shaft Q and parts carried thereby are allowed to move idly when the finger key R¹ is actuated.

The invention further contemplates the provision of means whereby the individual magazines may be independently removed (see Figs. 1, 13 and 14). The removal of the first or top magazine A¹ may be effected in the regular way with the assistance of portable side arms (not shown), the base frame therefor being provided with a center plate A⁹ (Fig. 14), which is hinged near the upper end of the frame and adapted to be raised by said arms to disengage the magazine from the escapements C preparatory to its removal. Such mechanism is fully disclosed in the McNamara Patent No. 1,586,316, to which reference may be had if desired. These special magazines A¹, however, are frequently made of less than standard length (as shown in Fig. 1) and may, therefore, be lifted off and interchanged without the use of such appliances.

In providing for the removal of the second magazine, the first or uppermost magazine base frame is equipped with a pair of hand levers T pivotally mounted on lugs T¹ projecting from the opposite sides of said frame. These levers T are connected to the next underlying or middle base frame by intermediate links or arms T², which are mounted to rock upon pivot studs t projecting from corresponding lugs T³. Normally, the hand levers T are disposed rearward of their pivotal axes and lie in the longitudinal plane of the magazines (see Fig. 14), being sustained in such position by stop pins t¹ projecting from the outer face of the levers T and engaging the rear edges of the arms T²; but, when the levers are rocked forwardly, the top magazine base frame will be swung upwardly about its pivot a² away from the second magazine A² into the raised position indicated by the dotted lines in Fig. 14, where it is sustained by the arms T² and locked by the engagement of the pins t¹ with the front edges thereof as the levers pass dead center. Ample space is thus provided for the second magazine to be first lifted from its base frame to disengage it from the escapements C, and then withdrawn forwardly from the machine.

Now, in order to remove the third or lowermost magazine A³, the shift frame is also provided with two pairs of extensible toggle links T⁴, T⁵ for swinging the upper magazines A¹, A² and their respective base frames A⁵ as a unit away from the lowermost magazine A³. The lower links T⁴ are pivotally connected to the lowermost magazine base frame A⁵, while the upper links T⁵ are similarly connected to the pivot studs t of the second or middle magazine base frame A⁵. The extension and collapse of the toggle links is controlled by a separate hand lever T⁶ arranged at the left of the machine and fastened to one end of a horizontal rock shaft T⁷, journaled in the lowermost base frame A⁵ at a point adjacent the rear edge of the links T³ and preferably spaced from their pivotal axes. The shaft T⁷ is provided with a pair of short arms T⁸, carrying at their free ends anti-friction rollers T⁹ which are adapted, as the lever T⁶ is swung forwardly, to track upon the lower or rear edges of the links T⁴ and cam them upwardly and forwardly in extending the toggles. This operation causes the first and second magazine base frames to be swung about their respective axes a², a³ away from the third magazine A³ to the full line position shown in Fig. 14, where they are sustained by the arms T⁸ through the engagement of the rollers T⁹ with concave recesses T¹⁰ formed in the links T⁴. In disengaging the magazine A³ from its escapements, as in the manner above indicated, it will be carried high enough to clear the assembler throat B and may then be removed in the usual way for interchange. After the interchange has been effected and the magazine reengaged with the escapements, the hand lever T⁶ is swung rearwardly, thereby disengaging the rollers T⁹ from the recesses T¹⁰ and gradually collapsing the toggles under the control of the arms T⁸ and the hand lever T⁶ until the first and second magazines are restored to their original position (shown in Fig. 13). With this method of extending and collapsing the toggles, a good leverage is obtained and the operations are greatly facilitated.

The invention has been shown only in preferred form and by way of example and as applied to the particular kind of machine described, but obviously many modifications and alterations therein and in its mode of adaptation will suggest themselves to those skilled in the art and still be comprised within its scope. It will also be noted that while the various features described are closely related and mutually cooperate to bring about the desired results, many of them might be used alone or in connection with other features to good advantage. It should be understood, therefore, that the invention is not limited to any specific form or embodiment except insofar as such limitations are specified in the appended claims.

Having thus described my invention, what I claim is:

1. In a typographical composing and distributing machine, the combination of a single fixed assembling mechanism, a series of superposed magazines, at least three in number, pivotally mounted at their upper ends in the fixed machine frame so that any selected one may be brought into operative relation to the single assembling mechanism, distributing mechanism comprising two character distributors and a font separator, and means for connecting said distributors to different selected pairs of magazines in the series.

2. In a typographical composing and distributing machine, the combination of fixed assembling mechanism, a series of superposed magazines, at least three in number, pivotally mounted at their upper ends, distributing mechanism comprising two character distributors arranged at different levels and a font separator arranged in line with the upper distributor, means for connecting the upper distributor constantly to a single magazine of the series, means for connecting the lower distributor to one or another of the remaining magazines, and means for swinging the magazines about their pivots to bring one or the other magazine of the pair connected to the distributors into operative relation to the assembling mechanism.

3. In a typographical composing and distributing machine, the combination of a series of superposed magazines, at least three in number, pivotally mounted at their upper ends, distributing mechanism comprising two character distributors and a font separator, means for connecting the distributors to different selected pairs of magazines, assembling mechanism, and means for swinging the magazines about their pivotal axes to locate either magazine of the selected pair in operative relation to the assembling mechanism without disturbing their connection with the respective distributors.

4. In a typographical composing and distributing machine, the combination of a series of superposed magazines, at least three in number, a common supporting frame for the magazines pivotally mounted at its upper end in the fixed machine frame, two character distributors arranged at different levels, a font separator arranged in line with the upper distributor, means for connecting the distributors to different selected pairs of magazines, assembling mechanism, and means for swinging the said supporting frame about its pivotal axis to locate either magazine of the selected pair in operative relation to the assembling mechanism without disturbing their connection with the respective distributors.

5. In a typographical distributing machine, the combination of two character distributors arranged at different levels and each comprising a toothed bar and a distinct set of matrix conveying screws, a font selecting bridge arranged in line with the upper distributor and serving to direct matrices of one font directly onto the upper distributor bar and to deliver matrices of other fonts to the lower distributor, a series of superposed magazines, at least three in number, intermediate means for connecting the upper distributor constantly to the top magazine of the series, and means for connecting the lower distributor to one or another of the remaining magazines, as required.

6. In a typographical distributing machine, the combination of two character distributors arranged at different levels and each comprising a toothed bar and a distinct set of matrix conveying screws, a font selecting bridge arranged in line with the upper distributor and serving to direct matrices of one font directly onto the upper distributor bar and to deliver matrices of other fonts to the lower distributor, a series of superposed magazines, at least three in number, a magazine entrance for conducting matrices from the upper distributor to a single magazine of the series, a second magazine entrance formed with branch passages for conducting matrices from the lower distributor to the remaining magazines, and a switch for directing the matrices released from the lower distributor into one or another of said passages, as required.

7. In a typographical distributing machine, the combination of two character distributors, an adjustable font selecting bridge controlling the delivery of the matrices to the respective distributors, a series of superposed magazines, at least three in number, means for constantly connecting one distributor to one magazine of the series, a switch for establishing a connection between the other distributor and one or another of the remaining magazines of the series, and means for setting the switch and adjusting the font selecting bridge in unison.

8. In a typographical distributing machine, the combination of a character distributor, a pair of superposed magazines, an intermediate switch for establishing a connection between the distributor and one or the other of said magazines, and safety means for preventing the operation of the switch while the matrices are present in the distributor.

9. In a typographical distributing machine, the combination of a character distributor, a pair of superposed magazines, an intermediate switch for establishing a connection between the distributor and one or the other of said magazines, a detector plate or feeler arranged to engage matrices while present in the distributor, and means for operating the switch and the feeler in unison.

10. In a typographical distributing machine, the combination of two character distributors, a font selecting bridge controlling the delivery of the matrices to the respective distributors, a series of superposed magazines, at least three in number, means for connecting one distributor to a single magazine of the series, a switch for establishing a connection between the other distributor and one or another of the remaining magazines of the series, and safety means for preventing the operation of the switch while matrices handled by the latter distributor are in course of distribution.

11. In a typographical machine, the combination of two character distributors, an adjustable font selecting bridge controlling the delivery of the matrices to the respective distributors, a series of superposed magazines, at least three in number, a magazine entrance for connecting one distributor with a single magazine of the series, a second magazine entrance, a switch associated with the latter entrance for directing matrices from the other distributor to one or the other of the remaining magazines, a movable detector plate or feeler arranged to engage matrices while supported by the latter distributor, and means for adjusting the bridge, setting the switch and operating the feeler in unison.

12. In a typographical distributing machine, the combination of two character distributors, an adjustable font selecting bridge controlling the delivery of the matrices to the respective distributors, a series of superposed magazines, at least three in number, a magazine entrance for connecting one distributor with a single magazine of the series, a second magazine entrance, a switch associated with the latter entrance for directing matrices from the other distributor to one or the other of the remaining magazines, a movable detector plate or feeler arranged to engage matrices while supported by the latter distributor, a hand lever, and intermediate connections whereby the adjustment of the bridge, the setting of the switch and the operation of the feeler is effected in unison by the operation of said lever.

13. In a typographical distributing machine, the combination of two character distributors, an adjustable font selecting bridge controlling the delivery of the matrices to the respective distributors, a series of superposed magazines, at least three in number, means for connecting one distributor to a single magazine of the series, an adjustable switch for establishing a connection between the other distributor and one or another of the remaining magazines, a plurality of gauge plates shiftable into and out of action for adjusting the bridge, and means for adjusting the switch and shifting the gauge plates in unison.

14. In a typographical distributing machine, the combination of two character distributors, an adjustable font selecting bridge controlling the delivery of the matrices to the respective distributors, a series of superposed magazines, at least three in number, means for connecting one distributor to a single magazine of the series, a magazine entrance pivotally mounted and movable to active and inactive position, a switch carried by said entrance for establishing a connection between the other distributor and one or another of the remaining magazines of the series, means operable in an inactive position of said entrance for adjusting the font selecting bridge, and means for automatically setting the switch to correspond with the adjustment of the bridge when the entrance is swung into active position.

15. In a typographical composing and distributing machine, the combination of two character distributors arranged at different levels and each comprising a toothed bar and a distinct set of matrix conveying screws, a font selecting bridge arranged in line with the upper distributor and serving to direct matrices of one font directly onto the upper distributor bar and to deliver matrices of other fonts to the lower distributor, a series of superposed magazines, at least three in number, pivotally mounted at their upper ends in the fixed machine frame, an intermediate magazine entrance for connecting the upper distributor with a single magazine of the series, a second magazine entrance, a switch associated therewith and adapted to be set in different positions for connecting the lower distributor to one or another of the remaining magazines, assembling mechanism, and means for swinging the magazines about their pivots to locate one or the other of the pair connected to the distributors in operative relation to the assembling mechanism without disturbing their connection with the respective distributors.

16. In a typographical composing and distributing machine, the combination of two character distributors arranged at different levels and each comprising a toothed bar and a distinct set of matrix conveying screws, a font separator arranged in line with the upper distributor and serving to direct matrices of one font directly onto the upper distributor bar and to deliver matrices of other fonts to the lower distributor, a series of superposed magazines, at least three in number, a common supporting frame for the magazines pivotally mounted in the fixed machine frame, a magazine entrance for connecting the upper distributor to a single magazine of the series, a second magazine entrance, a switch carried thereby and movable to different set positions for connecting the lower distributor to one or another of the remaining magazines, assembling mechanism, and means for swinging the supporting frame about its pivotal axis to locate one or the other of the magazines connected to the two distributors in operative relation to the assembling mechanism without disturbing the connection of the entrances with the respective distributors.

17. In a typographical composing and distributing machine, the combination of two character distributors arranged at different levels and each comprising a toothed bar and a distinct set of matrix conveying screws, an adjustable font selecting bridge arranged in line with the upper distributor and serving to direct matrices of one font directly onto the upper distributor bar and to deliver matrices of other fonts to the lower distributor, a series of superposed magazines, at least three in number, a common supporting frame therefor pivoted at its upper end in the fixed machine frame, a pair of intermediate magazine entrances also mounted in the magazine supporting frame, one for connecting a single magazine of the series to the upper distributor, and the other for connecting the remaining magazines to the lower distributor, a switch carried by the latter entrance for directing matrices into one or the other of the associated magazines, assembling mechanism, means for swinging the magazine supporting frame about its pivotal axis to bring one or another of the magazines connected to the two distributors into operative relation to the assembling mechanism, means for shifting the pivotal axis of the supporting frame during the swinging movement thereof so as to maintain an operative relation between the magazine entrances and the respective distributors, and means for setting the switch and adjusting the bridge to correspond to different selected pairs of magazines.

18. In a typographical composing and distributing machine, the combination of two character distributors, a font selecting bridge controlling the delivery of the matrices to the respective distributors, a series of superposed magazines, at least three in number, pivotally mounted at their upper ends, means for connecting the distributors with different pairs of magazines, assembling mechanism, means for swinging the magazines about their pivots to bring a selected one into operative relation to the assembling mechanism, and means for preventing the selection of a magazine other than one of the pair connected to the two distributors.

19. In a typographical composing and distributing machine, the combination of two character distributors arranged at different levels and each comprising a toothed bar and a distinct set of matrix conveying screws, a font selecting bridge arranged in line with the upper distributor and serving to direct matrices of one font directly onto the upper distributor bar and to deliver matrices of other fonts to the lower distributor, a series of superposed magazines, at least three in number, pivotally mounted at their upper ends, an intermediate magazine entrance for connecting the upper distributor with a single magazine of the series, a second magazine entrance, a switch associated with the latter entrance and adjustable to different positions to connect the lower distributor to one or another of the remaining magazines, assembling mechanism, means for swinging the magazines about their pivots to bring one or another into operative relation to the assembling mechanism, and locking means for holding the selected magazine in operative position, said locking means being effective only in conjunction with one or the other of the pair of magazines connected to the two distributors.

20. In a typographical composing and distributing machine, the combination of two character distributors arranged at different levels and each comprising a toothed bar and a distinct set of matrix conveying screws, an adjustable font selecting bridge arranged in line with the upper distributor and serving to direct matrices of one font directly onto the upper distributor bar and to deliver matrices of other fonts to the lower distributor, a series of superposed magazines at least three in number, pivotally mounted at their upper ends, an intermediate magazine entrance for connecting the upper distributor with a single magazine of the series, a second magazine entrance, a switch associated with the latter entrance and adjustable to different positions for connecting the lower distributor to one or another of the remaining magazines, means for adjusting the bridge and switch in unison, assembling mechanism, means for swinging the magazines about their pivots to bring a selected one thereof into operative relation to the assembling mechanism, locking means for holding the selected magazine in operative position, and means controlled by the adjusting means and cooperating with said locking means to prevent the selection of a magazine other than one of the pair connected to the distributors.

21. In a typographical composing and distributing machine, the combination of two character distributors arranged at different levels and each comprising a toothed bar and a distinct set of matrix conveying screws, an adjustable font selecting bridge arranged in line with the upper distributor and serving to direct matrices of one font directly onto the upper distributor bar and to deliver matrices of other fonts to the lower distributor, a series of superposed magazines, at least three in number, a common supporting frame therefor pivoted at its upper end in the fixed machine frame, an intermediate magazine entrance for connecting a single magazine of the series to the upper distributor, a second magazine entrance, a switch associated with the latter entrance and adjustable to different positions to connect the lower distributor with one or the other of the remaining magazines, means for adjusting the bridge and switch in unison, a fixed assembling mechanism, means for swinging the supporting frame about its pivotal axis to locate a selected one thereof in operative relation to the assembling mechanism, means for shifting the pivotal axis of the supporting frame during the pivotal movement thereof so as to maintain the operative relation of the magazine entrances to the respective distributors, locking means for holding the selected magazine in operative position, and means to prevent the selection of a magazine other than one of the pair connected to the distributors.

22. In a typographical composing and distributing machine, the combination of two character distributors arranged at different levels and each comprising a toothed bar and a distinct set of matrix conveying screws, an adjustable font selecting bridge arranged in line with the upper distributor and serving to direct matrices of one font directly onto the upper distributor bar and to deliver matrices of other fonts to the lower distributor, a series of superposed magazines, at least three in number, a common supporting frame therefor pivoted at its upper end in the fixed machine frame, an intermediate magazine entrance for connecting a single magazine of the series to the upper distributor, a second magazine entrance, a switch associated with the lattter entrance and adjustable to different positions to connect the lower distributor to one or the other of the remaining magazines, means for adjusting the bridge and switch in unison, a fixed assembling mechanism, toggle devices connected to the lower end of the said supporting frame, a hand lever for extending and collapsing the toggle devices to swing the supporting frame about its pivotal axis to bring one or another of the magazines in operative relation to the assembling mechanism, means for locking said lever in different positions to hold a selected magazine of the series in operative position, and means controlled by the switch adjusting means to prevent the locking of the handle in positions other than those for holding the magazines of the pair connected to the distributors.

23. In a typographical composing machine, the combination of a series of superposed inclined magazines, a common supporting frame therefor pivoted at its upper end in the fixed machine frame, a rock shaft, a pair of toggle devices mounted on said shaft and connected to the lower end of the supporting frame at opposite sides thereof, a fixed assembling mechanism, a hand lever connected to the rock shaft for extending and collapsing the toggle device to swing the supporting frame upwardly and downwardly about its pivotal axis to bring one or another of the magazines in operative relation to the assembling mechanism, and means for locking the hand lever in different positions to locate a selected magazine in operative position, said hand lever being adjustably connected to the rock shaft so as to locate the supporting frame and magazines vertically in proper relation to the assembling mechanism in the different locked positions of the hand lever, and the links of the respective toggle devices being adjustable longitudinally in relation to each other to locate said frame and magazines horizontally in relation to the assembling mechanism.

24. In a typographical composing machine, the combination of three superposed magazines, a supporting frame therefor pivoted at its upper end in the fixed machine frame, assembling mechanism, a set of extensible toggle devices connected to the lower end of the supporting frame for swinging it about its pivotal axis to bring a selected magazine into operative relation to the assembling mechanism, an adjustable stop carried in the machine frame and arranged when the toggles are collapsed to engage the supporting frame for locating the top magazine in operative position, a similar stop for arresting the movement of the toggles when extended for locating the bottom magazine in operative position, a pivoted hand lever for operating the toggles, and means for locking said lever in three different positions, one for each magazine, said locking means serving in the intermediate position of the handle to locate and lock the middle magazine in operative position.

25. In a typographical composing and distributing machine, the combination of two superposed channeled magazines pivotally mounted at their upper ends, one magazine containing a set of matrices occupying certain channels according to character and the other containing a set of matrices occupying differently located channels according to character, a fixed assembler entrance, two distinct distributors, one for each magazine, arranged at different levels and each comprising a toothed bar and a distinct set of matrix conveying screws, said bars differing as to form to correspond to their respective magazines, intermediate magazine entrances for connecting the magazines to the respective distributors, a font selecting bridge arranged in line with the upper distributor, means for swinging the magazines about their pivots to locate one or the other in operative relation to the fixed assembler entrance without disturbing their connection with the distributors, a set of key-controlled devices, and means controlled by the swinging of the magazines whereby said devices may be connected to the appropriate matrix channels of the particular magazines in use.

26. In a typographical composing and distributing machine, the combination of two superposed channeled magazines provided with escapements and containing matrices occupying differently located channels according to character, a single set of escapement actuating members, a corresponding set of key-controlled pivoted levers for operating said members, two sets of relatively fixed intermediate reeds for transmitting motion from the levers to the actuating members, the reeds of one set being straight and those of the other offset to correspond to the different location of the matrices in the magazines, two distinct distributors, one for each magazine, arranged at different levels and each comprising a toothed bar and a distinct set of matrix conveying screws, said bars differing as to form to correspond to their respective magazines, intermediate magazine entrances for connecting the magazines to the respective distributors, a font selecting bridge arranged in line with the upper distributor and serving to direct matrices of one font directly onto the upper distributor bar and to deliver matrices of other fonts to the lower distributor, means for selecting either magazine for use, and means controlled by the selecting means for shifting the key-controlled pivoted levers into operative relation to the appropriate set of fixed reeds.

27. In a typographical composing and distributing machine, the combination of three superposed channeled magazines, the upper magazine containing a set of matrices occupying certain channels according to character, and each of the other two containing a set of matrices occupying differently located channels according to character, a common supporting frame for the magazines pivotally mounted in the fixed machine frame, a fixed assembler entrance, two distinct distributors arranged at different levels and each comprising a toothed bar and a distinct set of matrix conveying screws, the upper distributor bar being formed to correspond to the upper magazine, and the lower distributor bar being differently formed to correspond to the other two magazines, a magazine entrance connecting the upper distributor to the upper magazine, means for connecting one or the other of the remaining magazines to the lower distributor, a font selecting bridge arranged in line with the upper distributor and serving to direct matrices of one font directly onto the upper distributor bar and to deliver matrices of other fonts to the lower distributor, means for swinging the said supporting frame about its pivotal axis to bring one or another of the magazines into operative relation to the fixed assembler entrance without disturbing their connection with the distributors, a set of key-controlled devices, and means whereby said devices may be connected to the appropriate channels of the particular magazine in use.

28. In a typographical composing machine, the combination of two superposed channeled magazines provided with escapements and containing matrices occupying differently located channels according to character, a single set of escapement actuating members, a corresponding set of key-controlled levers for operating said members, two sets of intermediate reeds for transmitting motion from the levers to the actuating members, the reeds of one set being straight and those of the other offset to correspond to the different location of the matrices in the magazines, means for selecting either magazine for use, and means for connecting said key-controlled levers to the appropriate set of reeds.

29. In a typographical composing machine, the combination of two superposed channeled magazines provided with escapements and containing matrices occupying differently located channels according to character, a single set of escapement actuating members, a corresponding set of key-controlled levers for operating said members, two sets of intermediate reeds for transmitting motion from the levers to the actuating members, the reeds of one set being straight and those of the other offset to correspond to the different location of the matrices in the magazines, means for selecting either magazine for use, and means controlled by the magazine selecting means for connecting said key-controlled levers to the appropriate set of reeds.

30. In a typographical composing machine, the combination of two superposed channeled magazines provided with escapements, one magazine containing a set of matrices occupying certain channels according to character and the other containing a set of matrices occupying differently located channels according to character, a single set of escapement actuating members, a corresponding set of key-controlled levers for operating said members, an adjustable slide bar wherein said levers are pivotally mounted, two sets of intermediate reeds for transmitting motion from the levers to the actuating members, the reeds of one set being straight and those of the other offset to correspond to the different location of the matrices in the magazines, means for shifting the magazines to bring one or the other into operative position, and means controlled by said magazine shifting means for adjusting said bar to locate the key-controlled levers in operative relation to the appropriate set of reeds.

31. In a typographical composing machine, the combination of two superposed channeled magazines provided with escapements and containing matrices occupying differently located channels according to character, a single set of escapement actuating members, a corresponding set of levers for operating said members, two sets of intermediate reeds for transmitting motion from the levers to the actuating members, the reeds of one set being straight and those of the other offset to correspond to the different location of the matrices in the magazines, an adjustable bar wherein said levers are pivotally mounted, a spring connected to said bar, key-controlled devices for rocking said levers, means for selecting either magazine for use, and means controlled by the magazine selecting means and acting in opposition to the spring for controlling the adjustments of the bar so as to locate the levers in operative relation to the appropriate set of reeds.

32. In a typographical composing machine, the combination of two superposed channeled magazines provided with escapements and containing matrices occupying differently located channels according to character, a single set of escapement actuating members, a corresponding set of key-controlled levers for operating said members, two sets of intermediate reeds for transmitting motion from the levers to the actuating members, the reeds of one set being straight and those of the other offset to correspond to the different location of the matrices in the magazines, an adjustable bar wherein said levers are pivotally mounted, a rock shaft provided with arms connected to said frame, and means controlled by the magazine selecting means for operating said rock shaft and adjusting the bar so as to locate the levers in operative relation to the appropriate set of reeds.

33. In a typographical composing machine, the combination of two sets of vertically disposed actuating reeds arranged one behind the other, the lower ends of the reeds of one set being aligned at the bottom with corresponding reed of the other set, a single set of rocking levers for operating the reeds, a series of key-controlled power-actuated rods for rocking the levers, an adjustable bar wherein said levers are pivotally mounted, and means for adjusting the bar to and fro to locate the levers in operative relation to one or the other set of reeds without disturbing their connection with said power-actuated rods.

34. In a typographical composing machine, the combination of two main channeled magazines provided with escapements, a single keyboard, means for connecting the keyboard to either selected magazine, an auxiliary magazine also provided with escapements arranged at the side of the main magazines, a series of intermediate devices for actuating the escapements of the auxiliary magazines, and means for establishing a connection between the keyboard and said devices while either main magazine is in use.

35. In a typographical composing machine, the combination of two main channeled magazines provided with escapements, a keyboard, two sets of intermediate reeds for actuating the escapements of the respective magazines, means for connecting the keyboard to the reeds of either set, an auxiliary magazine also provided with escapements arranged at the side of the main magazines, a series of intermediate devices for actuating the escapements of the auxiliary magazines, and means for connecting said devices to the keyboard while the latter is connected to the reeds of one set or the other.

36. In a typographical composing machine, the combination of two main channeled magazines, one containing a set of matrices occupying certain channels according to character and the other containing a set of matrices occupying differently located channels according to character, means for selecting either magazine for use, an auxiliary magazine arranged in laterally offset relation to the main magazines, a single keyboard, and intermediate connections whereby the keyboard may be operatively connected to the channels of either selected main magazines or of the auxiliary magazine, as desired.

37. In a typographical composing machine, the combination of two main channeled magazines provided with escapements and containing matrices occupying differently located channels according to character, an auxiliary magazine also provided with escapements and arranged in laterally offset relation to the main magazines, a single keyboard, a set of key-controlled members constantly connected to the keyboard and adjustable to establish a connection with the escapements of one or the other main magazine, and means for connecting a group of said members to the escapements of the auxiliary magazine irrespective of the adjusted position of the set.

38. In a typographical composing machine, the combination of two main channeled magazines provided with escapements and containing matrices occupying differently located channels according to character, a keyboard, means for selecting either magazine for use, means controlled by the magazine selecting means for connecting the keyboard to the escapements of the main magazine selected, an auxiliary magazine also provided with escapements and arranged at the side of the main magazines, a series of intermediate devices for actuating the escapements of the auxiliary magazine, and means operable at will for establishing a connection between the keyboard and said devices while either main magazine is in use.

39. In a typographical composing machine, the combination of two main channeled magazines provided with escapements, a keyboard, a set of adjustable key-controlled levers constantly connected to the keyboard, means for adjusting the set of levers to establish a connection between the keyboard and the escapements of either main magazine, an auxiliary magazine also provided with escapements and arranged at the side of the main magazines, a series of intermediate rocking bails for operating the escapements of the auxiliary magazine, and means operable at will for connecting a group of said key-controlled levers with the rocking bails irrespective of the particular main magazine in use.

40. In a typographical composing machine, the combination of two main channeled magazines provided with escapements, a keyboard, a set of levers for operating the escapements of the magazines, a corresponding set of power-actuated rods controlled by the finger keys of the keyboard for operating the levers, an adjustable supporting bar wherein the levers are mounted, means for adjusting the bar to connect the levers with the escapements of one main magazine or the other, an auxiliary magazine also provided with escapements and arranged at the side of the main magazines, a series of intermediate rocking bails for operating the escapements of the auxiliary magazine, and means for adjusting a group of said levers relatively to the supporting bar to connect the finger keys of the keyboard to the rocking bails.

41. In a typographical composing machine, the combination of two main channeled magazines provided with escapements, a keyboard, a set of escapement actuating members, a corresponding set of levers controlled by the finger keys of the keyboard, an adjustable set and a fixed set of intermediate reeds for transmitting motion from the levers to said actuating members, an adjustable supporting bar wherein said levers are mounted and having a relatively movable section carrying a selected group of the levers, means for adjusting the bar to bring the levers into operative relation to one or the other set of reeds, an auxiliary magazine also provided with escapements and arranged at the side of the main magazines, a series of intermediate rocking bails for operating the escapements of the auxiliary magazine, means operable at will for adjusting the adjustable set of reeds back and forth to make and break connection with the rocking bails, and means controlled by said reed adjusting means for effecting the relative movement of the bar section to locate the selected group of levers in operative relation to the corresponding reeds of the adjustable set when the levers are positioned in operative relation to the reeds of the other set.

42. A combination as specified in claim 41 characterized by the fact that the bar section therein referred to is held resiliently in a normal position by springs, and that means for moving the section acts only when the said supporting bar is set to locate the levers in operative relation to the reeds of the fixed set.

43. A combination as specified in claim 41, characterized by the fact that the adjustment of the adjustable set of reeds and the movement of the bar section are effected simultaneously by the actuation of a single finger key.

44. In a typographical composing machine, the combination of superposed magazines, at least three in number, a shift frame therefor comprising separate base frames pivotally mounted at their upper ends and whereon the magazines are removably mounted, means for moving the shift frame to bring one or another of the magazines into operative position, and mechanism for separating the base frames from each other to permit the removal of the magazines, said mechanism including a pair of extensible toggle links carried by the lowermost base frame and connected directly to the next overlying base frame for swinging the first and second magazines and their respective base frames as a unit away from the lowermost magazine, and subsidiary means whereby the first magazine base frame may be swung independently of the other base frames away from the second magazines.

45. In a typographical composing machine, the combination of superposed magazines, at least three in number, a shift frame therefor comprising separate base frames pivotally mounted at their upper ends and whereon the magazines are removably mounted, means for moving the shift frame to bring one or another of the magazines into operative position, and mechanism for separating the base frames from each other to permit the removal of the magazines, said mechanism comprising a pair of extensible toggle links connecting the lowermost base frame with the second base frame, a hand lever for extending the toggles to separate said base frames, and a separate hand lever pivoted to the first or uppermost base frame and connected to the next underlying base frame for causing the separation of the first and second base frames.

46. In a typographical composing machine, the combination of superposed magazines, at least three in number, a shift frame therefor comprising separate base frames pivotally mounted at their upper ends and whereon the magazines are removably mounted, means for moving the shift frame to bring one or another of the magazines into operative position, and mechanism for separating the base frames from each other to permit the removal of the magazines, said mechanism including a pair of extensible toggle links pivoted respectively to the two lower base frames, and means controlled by a hand lever for camming one of the toggle links about its pivotal axis to extend the toggles.

47. In a typographical composing machine, the combination of superposed magazines, at least three in number, a shift frame therefor comprising separate base frames pivotally mounted at their upper ends and whereon the magazines are removably mounted, means for moving the shift frame to bring one or another of the magazines into operative position, and mechanism for separating the base frames from each other to permit the removal of the magazines, said mechanism including a pair of extensible toggle links pivoted respectively to the two lower base frames, a rock shaft mounted in the lowermost base frame adjacent the links, and an intermediate arm secured to said shaft and adapted by the rotation thereof to cam one of the links about its pivotal axis to extend the toggles.

48. In a typographical composing machine, the combination of superposed magazines, at least three in number, a shift frame therefor comprising separate base frames pivotally mounted at their upper ends and whereon the magazines are removably mounted, means for moving the shift frame to bring one or another of the magazines into operative position, and mechanism for separating the base frames from each other to permit the removal of the magazines, said mechanism including a pair of extensible toggle links pivoted respectively to the two lower base frames, a rock shaft mounted in the lowermost base frame, and an intermediate arm secured to said shaft and provided with an anti-friction roller engaging the lower toggle link, the said arm being adapted by the rotation of the shaft to cam the lower link upwardly to extend the toggles and by the engagement of the roller with a recess formed in said link to sustain the toggles in their extended condition.

In testimony whereof, this specification has been duly signed by:

JOHN R. ROGERS.